United States Patent
Rao et al.

(10) Patent No.: US 12,494,876 B2
(45) Date of Patent: Dec. 9, 2025

(54) HANDLING POSITIONING REFERENCE SIGNALS IN WIRELESS SYSTEMS

(71) Applicant: InterDigital Patent Holdings, Inc., Wilmington, DE (US)

(72) Inventors: Jaya Rao, Montreal (CA); Fumihiro Hasegawa, Westmount (CA); Moon-il Lee, Melville, NY (US); Ghyslain Pelletier, Montreal (CA); Paul Marinier, Brossard (CA); Aata El Hamss, Laval (CA); Tuong Duc Hoang, Montreal (CA); Janet A. Stern-Berkowitz, Little Neck, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/019,604

(22) PCT Filed: Aug. 5, 2021

(86) PCT No.: PCT/US2021/044608
§ 371 (c)(1),
(2) Date: Feb. 3, 2023

(87) PCT Pub. No.: WO2022/031889
PCT Pub. Date: Feb. 10, 2022

(65) Prior Publication Data
US 2023/0283424 A1    Sep. 7, 2023

Related U.S. Application Data

(60) Provisional application No. 63/185,432, filed on May 7, 2021, provisional application No. 63/168,018, filed
(Continued)

(51) Int. Cl.
*H04L 5/00* (2006.01)
*H04W 64/00* (2009.01)

(52) U.S. Cl.
CPC .......... *H04L 5/0048* (2013.01); *H04L 5/0053* (2013.01)

(58) Field of Classification Search
CPC ... H04L 5/0048; H04L 5/0078; H04L 5/0053; H04L 5/0094
See application file for complete search history.

(56) References Cited

U.S. PATENT DOCUMENTS

| | | | |
|---|---|---|---|
| 11,558,877 B2 | 1/2023 | Akkarakaran et al. | |
| 11,889,438 B2 | 1/2024 | Thangarasa et al. | |

(Continued)

FOREIGN PATENT DOCUMENTS

| | | |
|---|---|---|
| AU | 2017308909 A1 | 2/2019 |
| WO | 2017172937 A1 | 10/2017 |

(Continued)

OTHER PUBLICATIONS

3GPP TSG RAN WG1 Meeting#87, R1-1611144 Title:Configuration of downlink positioning reference signal for NB-IoT (Year: 2016).*

(Continued)

*Primary Examiner* — Christopher M Crutchfield
*Assistant Examiner* — Abusayeed M Haque
(74) *Attorney, Agent, or Firm* — Condo Roccia Koptiw LLP

(57) ABSTRACT

Systems, methods, and instrumentalities are described for handling positioning reference signals in a wireless communication system. The positioning reference signals may be assigned priorities that may be used to facilitate various operations of a wireless transmit/receive unit (WTRU) such as positioning related services, collision avoidance, measurement and reporting, etc. The WTRU may be configured with multiple muting patterns associated with the positioning reference signals and may switch between different (Continued)

muting patterns based on the priorities of the positioning reference signals and/or other downlink (DL) or uplink (UL) transmissions that may overlap or collide with the positioning reference signals.

22 Claims, 10 Drawing Sheets

Related U.S. Application Data on Mar. 30, 2021, provisional application No. 63/091,600, filed on Oct. 14, 2020, provisional application No. 63/061,651, filed on Aug. 5, 2020.

(56) References Cited

U.S. PATENT DOCUMENTS

| | | | |
|---|---|---|---|
| 2015/0071101 A1 | 3/2015 | Mager et al. | |
| 2015/0365790 A1 | 12/2015 | Edge et al. | |
| 2018/0035251 A1 | 2/2018 | Bitra | |
| 2019/0082460 A1* | 3/2019 | Nam | H04W 72/23 |
| 2019/0181932 A1* | 6/2019 | Jayawardene | H04W 72/046 |
| 2019/0182093 A1* | 6/2019 | Jayawardene | H04L 27/2657 |
| 2019/0387377 A1* | 12/2019 | Zhang | H04W 52/383 |
| 2020/0092913 A1* | 3/2020 | Xu | H04W 74/0816 |
| 2020/0137779 A1* | 4/2020 | Sun | H04L 5/0032 |
| 2020/0154449 A1 | 5/2020 | Akkarakaran et al. | |
| 2020/0225309 A1 | 7/2020 | Manolakos et al. | |
| 2020/0314793 A1 | 10/2020 | Kumar et al. | |
| 2020/0367193 A1 | 11/2020 | Cha et al. | |
| 2024/0201310 A1 | 6/2024 | Hasegawa et al. | |

FOREIGN PATENT DOCUMENTS

| | | | | |
|---|---|---|---|---|
| WO | 2020065894 A1 | 4/2020 | | |
| WO | WO-2020066854 A1 * | 4/2020 | | H04W 72/04 |
| WO | 2020145739 A1 | 7/2020 | | |

OTHER PUBLICATIONS

3rd Generation Partnership Project, TS 37.355 V.16.0.0, "Technical Specification Group Radio Access Network, LTE Positioning Protocol (LPP) (Release 16)", Mar. 2020, pp. 1-281.
3rd Generation Partnership Project, TS 38.211 V16.2.0, "Technical Specification Group Radio Access Network, NR, Physical channels and modulation (Release 16)", Jun. 2020, pp. 1-131.
3rd Generation Partnership Project, TS 38.305 V.16.2.0, "Technical Specification Group Radio Access Network, NG Radio Access Network (NG-RAN), Stage 2 functional specification of User Equipment (UE) positioning in NG-RAN (Release 16)", Sep. 2020, pp. 1-117.
3rd Generation Partnership Project, TS 38.331 V.16.0.0, "Technical Specification Group Radio Access Network, NR, Radio Resource Control (RRC) protocol specification (Release 16)", Mar. 2020, pp. 1-835.
WO 2020/145739 A1, US 2020/0367193 A1.
3rd Generation Partnership Project, "Views on DL reference signal designs for NR positioning", 3GPP TSG RAN WG1 Meeting #97 R1-1907177, Mitsubishi Electric; Reno, USA, May 13-17, 2019, 8 pages.
3rd Generation Partnership Project, R1-1911132, "DL Reference Signals for NR Positioning", 3GPP TSG RAN WG1 #98; Qualcomm Incorporated; Chongqing, China, Oct. 14-18, 2019, 20 pages.
3rd Generation Partnership Project, R1-1913447, "Summary #2 of UE and gNB measurements for NR Positioning", 3GPP TSG RAN WG1 #99; CATT; Reno, Nevada, Nov. 18-22, 2019, 23 pages.

* cited by examiner

HANDLING POSITIONING REFERENCE SIGNALS IN WIRELESS SYSTEMS

CROSS-REFERENCE TO RELATED APPLICATIONS

This application is the National Stage Entry under 35 U.S.C. § 371 of Patent Cooperation Treaty Application No. PCT/US2021/044608, filed Aug. 5, 2021, which claims the benefit of Provisional U.S. patent application Ser. No. 63/061,651, filed Aug. 5, 2020, Provisional U.S. Patent No. 63/091,600, filed Oct. 14, 2020, Provisional U.S. Patent Application No. 63/168,018, filed Mar. 30, 2021 and Provisional U.S. Patent Application No. 63/185,432, filed May 7, 2021, the disclosure of which is incorporated herein by reference in its entirety.

BACKGROUND

Mobile communication technologies continue to evolve. A fifth generation of mobile communication radio access technologies (RAT) may be referred to as 5G or new radio (NR). Previous (e.g., legacy) generations of mobile communication RAT may include, for example, fourth generation (4G) or long term evolution (LTE). A mobile communication system such as a 5G/NR communication system may utilize reference signals such as a positioning reference signal (PRS) and/or a sounding reference signal (SRS) for positioning to provide positioning related services to a wireless transmit receive unit (WTRU). The transmission and/or reception of these reference signals may be improved to decrease the latency/overhead and increase the accuracy of the positioning related services.

SUMMARY

Systems, methods, and instrumentalities are described herein regarding positioning reference signals. In accordance with one or more embodiments, a wireless transmit/receive unit (WTRU) may be configured to receive information regarding a first muting pattern associated with a set of positioning reference signal (PRS) time resources and information regarding a second muting pattern associated with the set of PRS time resources. The WTRU may determine, while operating in accordance with the first muting pattern, that a PRS transmission is to collide with a non-PRS transmission (e.g., a control channel transmission or a data channel transmission) in a first time resource of the set of PRS time resources. The WTRU may determine that the PRS transmission has a lower priority than the non-PRS transmission and may, in response, receive the non-PRS transmission, select, based on the first muting pattern and the second muting pattern, a second time resource from the set of PRS time resources that corresponds to an earliest unmuted PRS transmission after the non-PRS transmission, and receive, using the second time resource, the earliest unmuted PRS transmission.

In embodiments, the WTRU may be configured to receive an indication of a priority associated with the first time resource and determine that the PRS transmission has the lower priority than the non-PRS transmission based on the indication. The indication may be included in a radio resource control (RRC) message, a media access control (MAC) control element (CE), or downlink control information (DCI). In embodiments, the earliest unmuted PRS transmission described above may be received in accordance with the second muting pattern after the WTRU determines that a first unmuted PRS transmission to be received after the non-PRS transmission in accordance with the first muting pattern is later in time than this earliest unmuted PRS transmission.

In embodiments, the WTRU may be configured to operate in accordance with the second PRS muting pattern after receiving the earliest unmuted PRS transmission using the second time resource, or the WTRU may be configured to switch back to operating in according with the first muting pattern after receiving the earliest unmuted PRS transmission using the second time resource. In the latter case, the WTRU may switch back to operating in according with the first muting pattern based on an indication received from a network (e.g., the WTRU may receive information from the network that the first muting pattern is the default muting pattern for the WTRU).

In embodiments, the WTRU may be configured to consider priorities of positioning reference signals in various aspects of the WTRU's operation including, for example, measurement and reporting, rate matching, puncturing, simultaneous transmission and/or reception of a positioning reference signal with other uplink/downlink transmissions and/or receptions, etc.

DETAILED DESCRIPTION

Figure 1A:
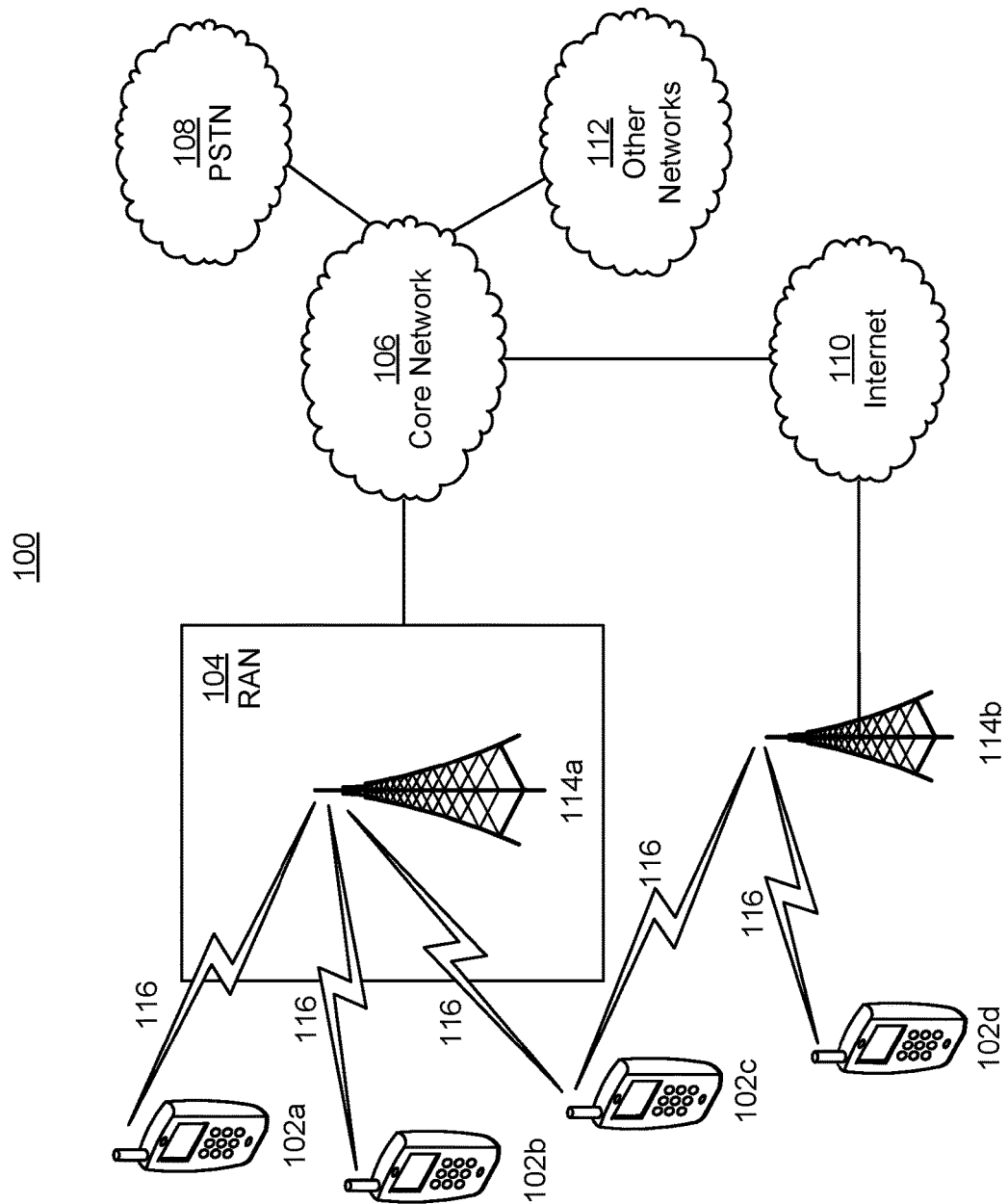
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
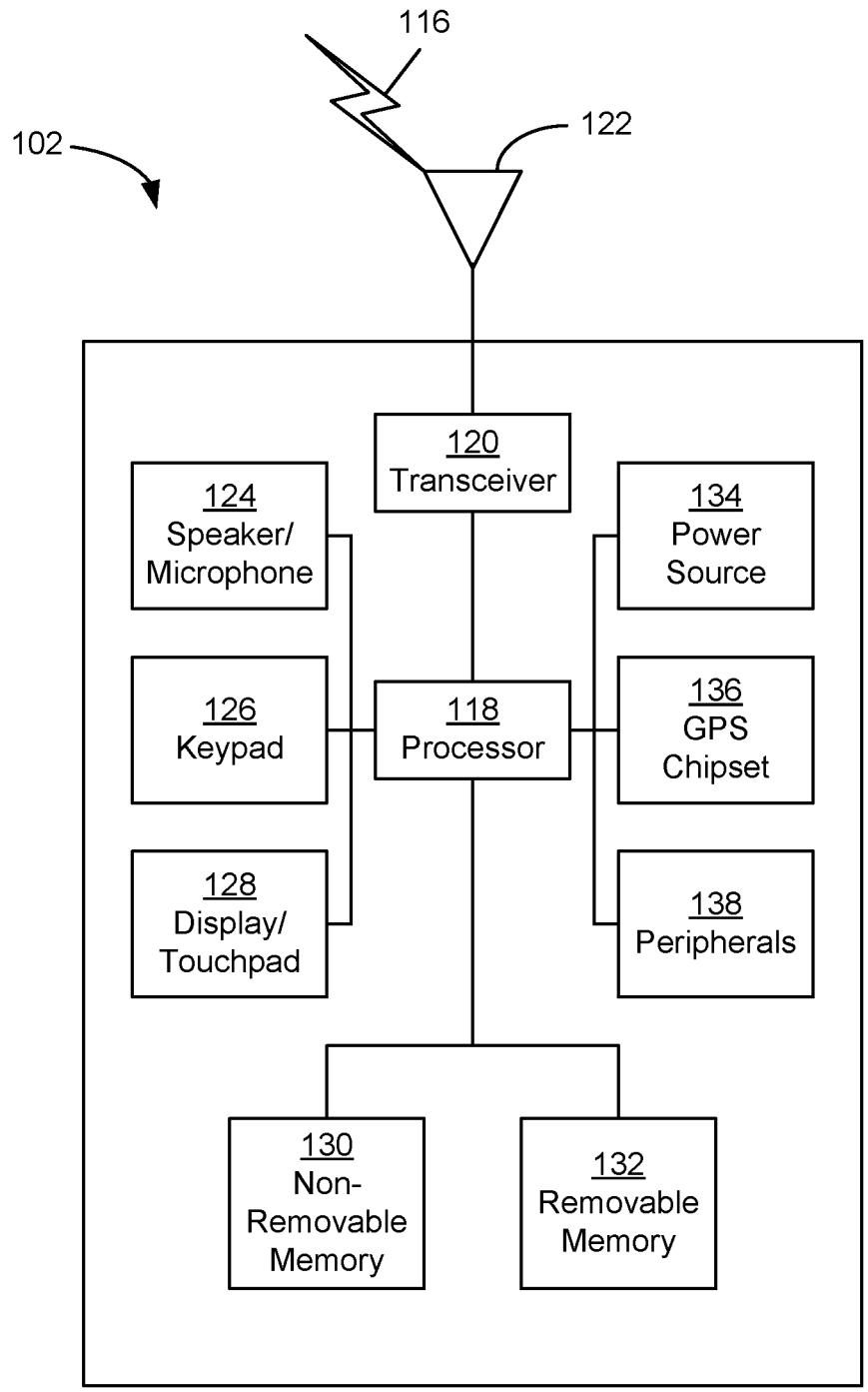
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
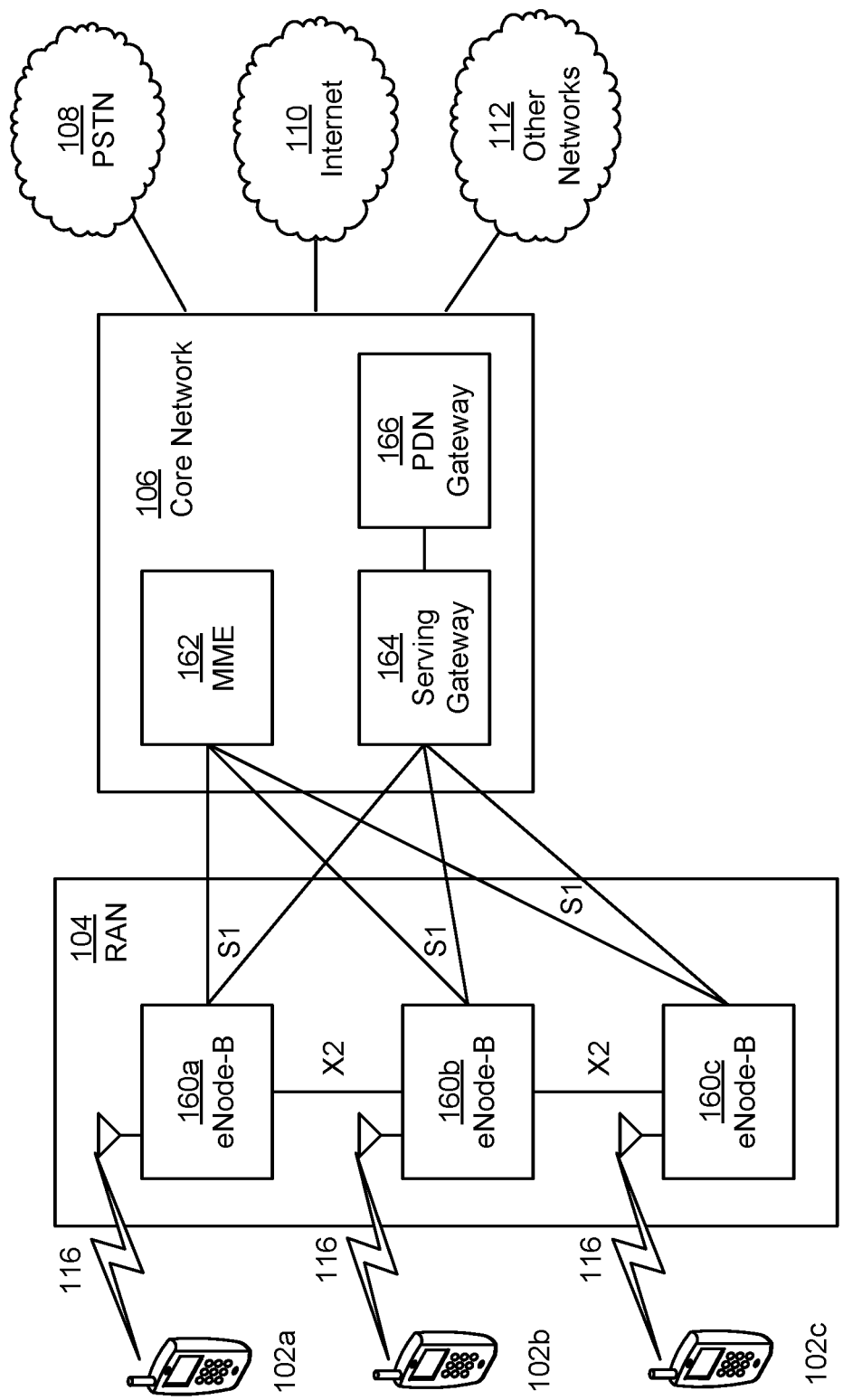
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
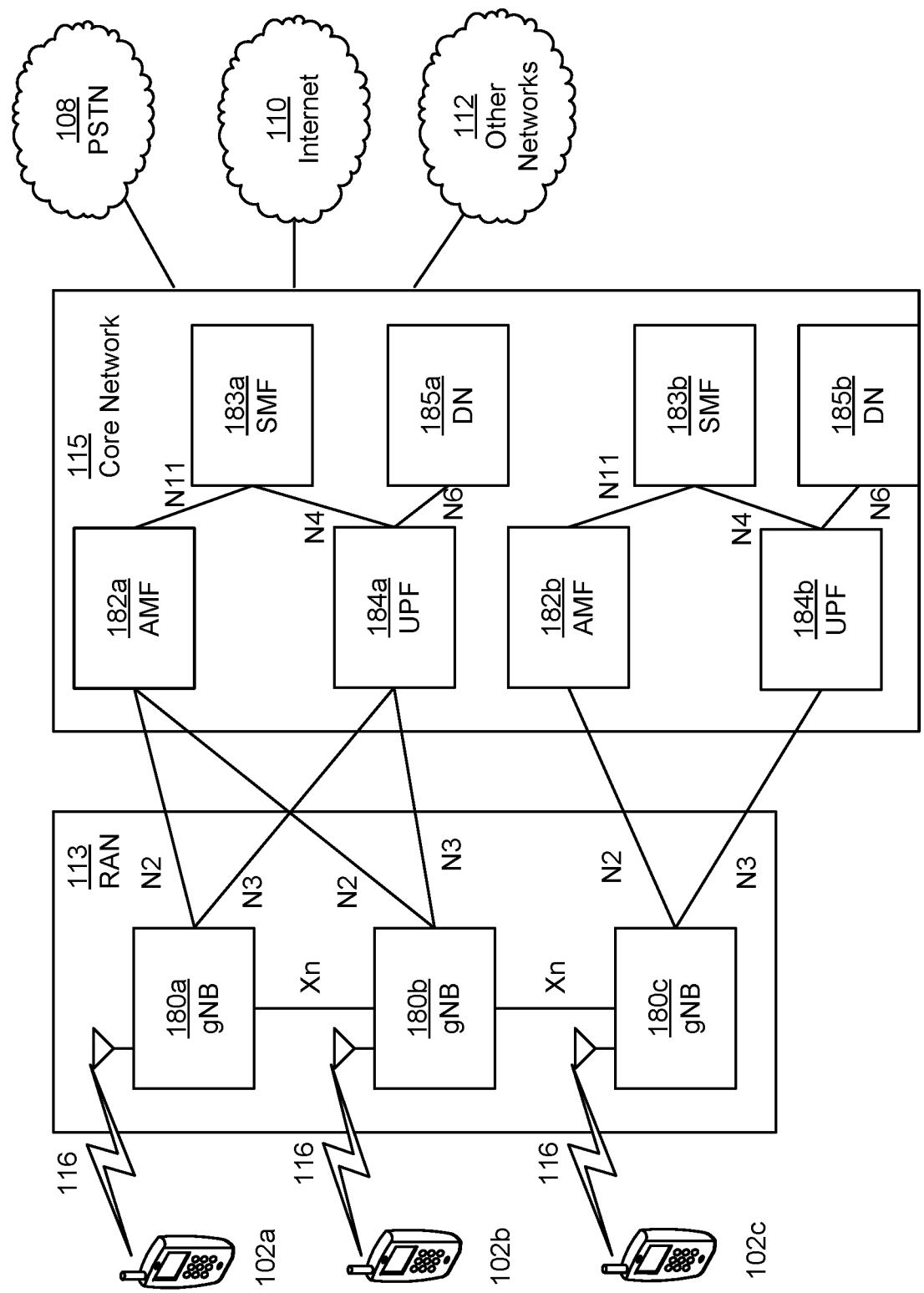
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Reference signals such as a positioning reference signal (PRS), a sounding reference signal (SRS) for positioning (SRSp), etc., may be transmitted/received in a mobile communication system (e.g., PRS for a downlink (DL) and SRSp for an uplink (UL)). In some example systems, a PRS and/or an SRSp may be given (e.g., by default) lower priorities compared to other types of signals such as control signals. This may lead to a PRS and/or SRSp being dropped from transmission and/or reception if they overlap with other (e.g., higher priority) signals (e.g., data and/or control channel transmissions) in time and/or frequency resources. In at least some situations (e.g., when a low or short latency for positioning is desired), giving low priority (e.g., by default) to PRS's and/or SRSp's may prevent a communication system from achieving low latency, for example, with respect to positioning related services.

Priorities may be provided for (e.g., assigned to) reference signals such as those used for positioning, for example, to achieve low latency performance. A PRS may be configured based on a positioning protocol such as an LTE positioning protocol (LPP). An SRSp may be configured via radio resource control (RRC) signaling. In examples, the priority of a PRS and/or an SRSp may be provided (e.g., specified) as a part of the configuration information associated with those reference signals such that prioritization may be performed for the reference signals (e.g., without the priority information, positioning reference signals may receive lower priority by default compared to reference signals and/or other data/control transmissions).

Reference signals for positioning may not be transmitted/received (e.g., may be dropped) or may be partially transmitted/received when the reference signals collide with other transmissions (e.g., data and/or control channel transmissions) or other reference signals. The dropped or partial transmission/reception may result from a lower priority being assigned (e.g., by default) to the positioning reference signals. For example, in some systems, a WTRU may not receive a PRS where/when a synchronization signal block (SSB) is being transmitted. Such collisions (e.g., a DL collision between a PRS and another signal) may be handled in a manner to lessen the impact of dropped or partially performed transmission/reception. Assigning or otherwise indicating priorities (e.g., higher priorities) to positioning reference signals (e.g., PRS's in the DL and/or SRSp's in the UL) may allow for low latency and/or high accuracy positioning related services (e.g., by allowing positioning reference signals to transmitted or received over other data/control channels or other reference signals), reduced the overhead associated with signaling and configuration, etc.

The priorities of positioning reference signals may be indicated and/or determined directly or indirectly, for example, based on one or more parameters associated with the reference signals. A WTRU may be configured with behaviors to accommodate the direct or indirect priority indication. Such behaviors may be related to, for example, the performance of measurement and reporting, transmission interruption handling, collision handling, rate matching, signal muting, power control, and/or the like. Various network entities may provide and/or support positioning related services. An location management function (LMF) is used herein a non-limiting example of such network nodes or entities. Other nodes and/or entities may be substituted for the LMF and still be consistent with this disclosure.

Priorities may be configured and/or determined for reference signals that are associated with positioning related services. An SRSs may refer to an SRS transmitted or received for positioning purposes (e.g., at least partially). Resources associated with an SRSp may be defined (e.g., signaled or scheduled), for example, via RRC signaling (e.g., using an RRC message). Such resources may include, for example, an SRS resource set and/or one or more SRS resources. When referred to herein, an SRSp or SRS may include, for example, an SRS configured by at least one of the following information elements in a standard specification: SRS-PosResourceSet-r16, SRS-PosResource-r16, SRS-ResourceSet, or SRS-Resource. When referred to herein, an SRSp or SRS may also include an SRS not configured by or not associated with the aforementioned information elements. When referred to herein, an SRSp or SRS may include, for example, a UL RS associated with positioning, a DM-RS for UL, a phase tracking reference signal (PTRS) for UL, and/or the like. When referred to herein, a positioning reference signal or positioning RS may include a DL RS such as a PRS, and/or a UL RS, such as a SRSp. The use of a PRS, SRS, and SRSp may not be limited to positioning, and may extend to other functions/purposes as well. The techniques disclosed herein may be applied to or used with other DL or UL reference signals.

The priority of a reference signal such as a positioning reference signal may be indicated and/or determined based on a direct (e.g., explicit) indication. The priority may be indicated through a higher layer (e.g., RRC) or a lower layer (e.g., a medium access control (MAC) layer or a physical layer) indication. In some examples, a WTRU may be configured to receive a PRS, for example, according to a priority indicated by a higher layer (e.g., by RRC signaling including RRC configuration). A WTRU may (e.g., additionally and/or alternatively) be configured to receive a PRS, for example, according to a priority indicated by lower layer signaling, which may provide a faster mechanism for indicating the priority. The lower layer indication may be provided by MAC signaling (e.g., a MAC CE) or by downlink control information (DCI) (e.g., received on a physical downlink control channel (PDCCH)).

The priorities of reference signals (e.g., positioning reference signals) may be indicated by higher layer signaling such as through higher layer configuration information. One or more priority levels may be used, configured, or determined for a positioning reference signal (e.g., a PRS, an SRSp, a channel state information (CSI)-reference signal (RS), an SSB, a tracking reference signal (TRS), a global navigation satellite system (GNSS) signal, and/or the like). A priority level may be used interchangeably with a priority index, a priority indicator, a quality of service (QoS) level, a QoS indicator, a traffic type (e.g., eMBB, URLLC), a L1 priority, a priority, a priority type, a resource type, and/or the like. A priority level for a reference signal may be (e.g., commonly) used across physical channels and/or signals. The priority level may be used to determine the priority of a physical channel or signal, for example, when one or more physical channels and signals overlap (or collide) in a resource.

In some examples, a priority level for a positioning reference signal may be configured or indicated by a positioning service network component (e.g., a location management function (LMF)) and/or a gNB. For example, a configuration associated with a positioning reference signal may include a priority level associated with the positioning reference signal. The priority level for a positioning reference signal may be indicated, for example, based on a positioning protocol such as the LTE positioning protocol (LPP).

In some examples, a WTRU may receive configuration information (e.g., based on the LPP) that indicates a priority level for a positioning reference signal (e.g., a PRS). The priority level may be indicated, for example, by numerical values or characters. For example, a value of "1" may indicate (e.g., in a resource set configuration and/or a resource configuration) a high(er) priority level while a value of "0" may indicate a low(er) priority level. Such a priority indication may be included, for example, in a PRS resource set configuration or a PRS resource configuration. A priority level indicated in a PRS resource set configuration may be applicable to one or more PRS resources that belong to the PRS resource set. A WTRU may be configured to receive a PRS according to a configured priority.

Figure 2:
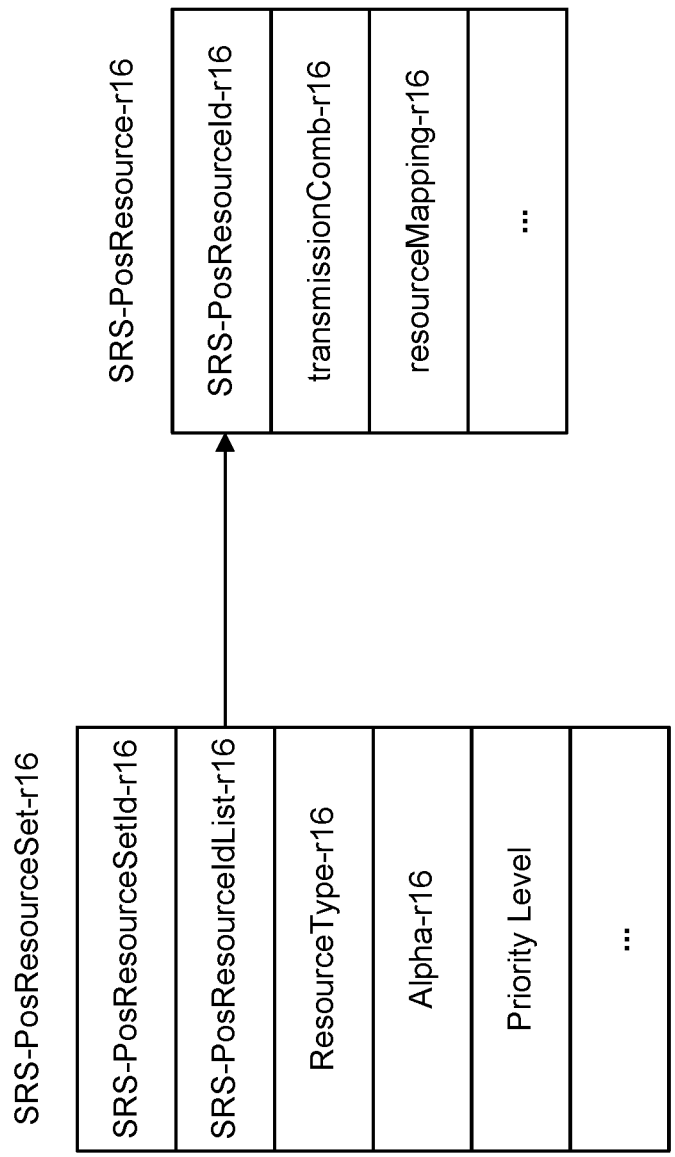
FIG. 2 illustrates a first example configuration structure associated with a positioning reference signal.

In some examples, a WTRU may receive RRC configuration information that may indicate a priority for a positioning reference signal (e.g., an SRSp). For instance, the WTRU may receive an indication of a priority level in an SRSp resource set configuration or an SRSp resource configuration (e.g., similar to a priority indication mechanism based on the LPP). FIG. 2 illustrates an example of an SRS RRC configuration structure (e.g., for an SRSp) that may include a parameter (e.g., "Priority Level") in an SRS-PosResourceSet that indicates a priority of one or more (e.g., all) SRS-PosResources belonging to the resource set. The WTRU may transmit an SRSp (e.g., with a corresponding configured priority level) using a configured SRSp resource that belongs to the resource set. In some examples, a priority indicated in a resource set configuration (e.g., SRS-PosResourceSet) may be overwritten by a priority indicated in a resource configuration (e.g., SRS-PosResource), and the WTRU may determine a priority associated with a resource based on the indication included in the resource configuration (e.g., instead of the resource set configuration). Such a resource configuration (e.g., from which the WTRU may determine a priority associated with the resource) may be received by the WTRU via RRC signaling, DCI, or a MAC-CE.

Figure 3:
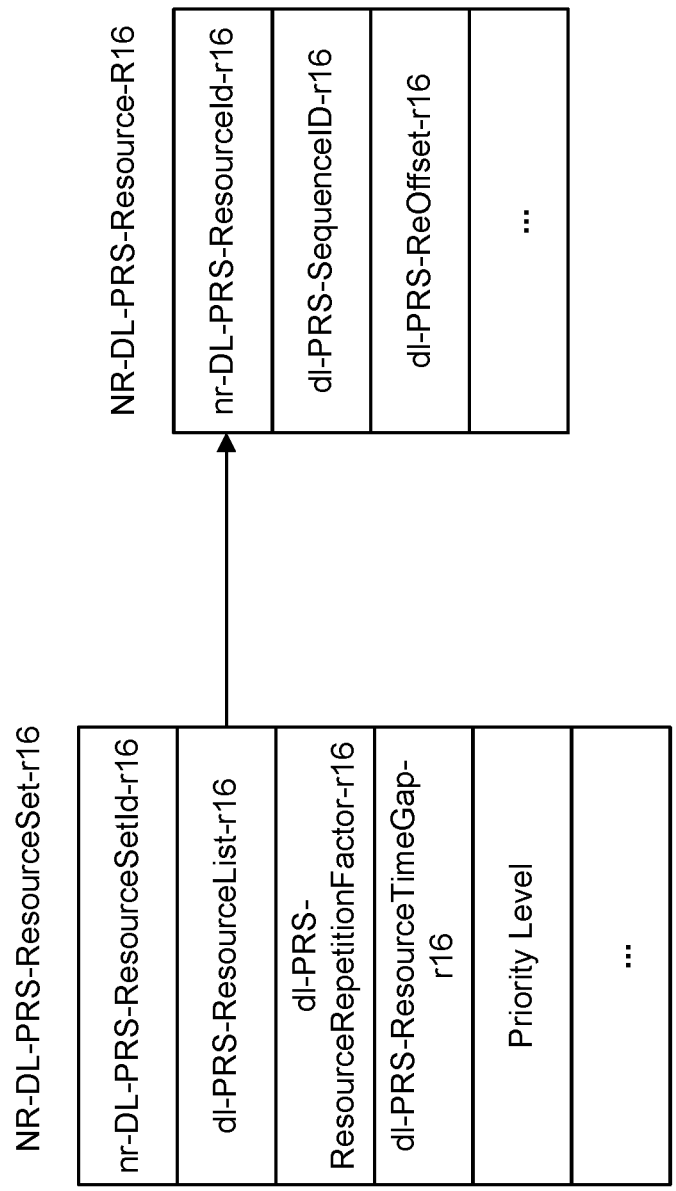
FIG. 3 illustrates a second example configuration structure associating a positioning reference signal.

FIG. 3 illustrates an example of a PRS LPP configuration structure. As shown, a priority (e.g., "Priority Level") for one or more PRS's may be included in a source set configuration such as NR-DL-PRS-ResourceSet-r16. The priority level indicated therein may be applicable to one or more resources (e.g., one or more NR-DL-PRS-Resource-r16) that belong to the resource set, for example, as indicated by dl-PRS-ResourceList-r16.

The priorities of reference signals (e.g., for positioning) may be indicated through a lower layer transmission. A WTRU may be (e.g., dynamically) configured with a priority associated with a positioning RS. Such configuration information may be provided, for example, using DCI (e.g., included in a PDCCH transmission), which may trigger the transmission of an SRSp and/or a report of a measurement performed on a PRS. The priority indication provided via the DCI may include, for example, one or more of the following: a (e.g., explicit) bitfield in the DCI; a radio network temporary identifier (RNTI) used to trigger the DCI; a control resource set (CORESET) and/or a search space set on which the DCI is received; a bandwidth part (BWP) on which the DCI is received; a component carrier on which the DCI is received; and/or the like. The (e.g., explicit) bitfield in the DCI may be an existing (e.g., repurposed/reused) bitfield or an additional bitfield. The RNTI used in the DCI triggering may be an RNTI configured for a (e.g., high priority) type of service. Such an (e.g., high priority) RNTI may be used to schedule (e.g., high priority) data and (e.g., high priority) control signalling (e.g., a HARQ acknowledgement/negative-acknowledgement report). Such an RNTI may be used to trigger an (e.g., a high priority) RS transmission and/or measurement report. The CORESET and/or search space (SS) set on which the DCI is received may be configured for a (e.g., high priority) type of service.

The techniques, procedures, and/or methods described herein may reduce end-to-end latency for positioning and configuration, improve positioning accuracy, reduce overhead for configuration, etc. Other benefits and advantages may also be obtained, which, for ease of description, are not all listed or repeated herein.

A WTRU may be configured to receive an implicit indication of priorities associated with positioning reference signals. The implicit indicator may be based on, for example, one or more parameters with which positioning is performed and/or an environment in which positioning is performed. In some examples, the WTRU may be configured to receive a PRS that is prioritized over other data/control channel transmissions, e.g., based on one or more parameters configured for the PRS. In some examples, a collision may occur between one or more other channels and an SRSp, and the WTRU may be configured to respond to the collision (e.g., to an indication of the collision) by transmitting the SRSp or dropping the SRSp, e.g. based on one or more parameters associated with the SRSp.

A priority level for a reference signal may be (e.g., implicitly) determined, for example, based on a DCI reception. A WTRU may determine a priority level for a positioning reference signal based on (e.g., as a function of) one or more characteristics of the DCI (e.g., the DCI may trigger the transmission of an aperiodic positioning reference signal). In some examples, such characteristics may be associated with the contents of the DCI. For instance, the WTRU may determine that a priority of a positioning reference signal is higher if the DCI does not allocate resources for transmission of data, and lower if the DCI allocates resources for transmission of data. In some examples, such characteristics may be associated with a DCI type and/or format. For instance, a WTRU may determine that a priority of a positioning reference signal is higher if the received DCI is of a first DCI format, and lower if the received DCI is of a second DCI format. In some examples, such characteristics may be associated with a resource on which the WTRU (e.g., successfully) decoded the DCI. For instance, the WTRU may determine that a priority of a positioning reference signal is higher if the DCI is received on a first set of resources (e.g., a first CORESET and/or period thereof for URLLC scheduling), and lower if the DCI is received on a second set of resources.

A priority level for a reference signal may be (e.g., implicitly) determined based on an indication included in DCI that is transmitted on a downlink control channel. For example, a DCI transmission may trigger an aperiodic positioning reference signal (AP-PRS), and a priority level associated with the AP-PRS may be indicated in the DCI (e.g., explicitly or implicitly). For instance, the priority level may be explicitly indicated in the DCI via a priority level field. The priority level may be implicitly indicated by an RNTI associated with the DCI and/or a priority level associated with a physical downlink shared channel (PDSCH) or a physical uplink shared channel (PUSCH) associated with the DCI. For example, a DCI scheduling a PDSCH or a PUSCH may be used to trigger an AP-PRS and the priority level of the AP-PRS may be determined based on the priority level of the PDSCH or PUSCH.

A priority level for a reference signal may be (e.g., implicitly) determined based on an associated physical channel. In some examples, a priority level of a positioning reference signal may be determined based on a configuration of an associated BWP and/or one or more parameters associated with the BWP. These parameters may include, for example, one or more of a subcarrier spacing, a cyclic prefix (CP) length, a DM-RS configuration, a number of resource blocks (RBs), and/or the like. One or more of following may apply to the determination of priority levels. For example, a first priority level may be determined for a positioning RS in a first BWP in accordance with a first subcarrier spacing associated with the first BWP, and a second priority level may be determined for a positioning RS in a second BWP in accordance with a second subcarrier spacing associated with the second BWP (e.g., the first priority level may be higher than the second priority level if the first subcarrier spacing is wider or narrower than the second subcarrier spacing).

A priority level for a positioning reference signal may be (e.g., implicitly) determined based on a configuration of an associated PDSCH or PUSCH (e.g., a PDSCH or PUSCH scheduled in the same DCI as the reference signal). For example, a DCI transmission that schedules a PDSCH or PUSCH may trigger an AP-PRS and the priority level of the AP-PRS may be determined based on a configuration of the PDSCH or PUSCH. Such a configuration may include, for example, a TTI length (e.g., a number of symbols for PDSCH or PUSCH scheduling, indicated HARQ timing, and/or the like. A WTRU may determine a first priority level for the positioning reference signal, for example, if HARQ reporting timing for an associated PDSCH is less than a threshold. The WTRU may determine a second priority level for the positioning reference signal, for example, if HARQ reporting timing for the associated PDSCH is equal to or larger than a threshold.

A priority level for a positioning reference signal may be (e.g., implicitly) determined based on one or more transmission parameters or characteristics (e.g., which may be associated with the reference signal). These parameters or characteristics may include, for example, symbol(s), transmission time intervals (e.g., frame, subframe, etc.), a window in time, a period, a set of one or more PRB(s), a BWP, and/or a specific cell associated with a WTRU. In examples, a priority level for a positioning reference signal may be determined based on (e.g., as a function of) the time and/or frequency resources associated with the reference signal. In examples, a WTRU may determine that a first positioning reference signal has a first priority if a corresponding transmission associated with the first positioning reference signal is associated with a first set of one or more transmission parameters or characteristics described above, and the WTRU may determine that a second positioning reference signal has a second priority if a corresponding transmission associated with the second positioning reference signal is associated with a second set of one or more transmission parameters or characteristics (e.g., different than the first set of parameters or characteristics) described herein.

A priority level for a reference signal may be (e.g., implicitly) determined based on a timing of a transmission. For example, a positioning reference signal may be determined to have a high(er) priority if the transmission of the reference signal is associated with a resource that is associated with a first (e.g., periodically recurring) period, and the positioning reference signal may be determined to have a low(er) priority if the transmission of the reference signal is associated with a resource that is associated with a second (e.g., aperiodic and/or non-recurring) period.

A priority of a positioning RS may be determined by the number of occasions that the transmission of the positioning RS is interrupted (e.g., dropped, suspended, etc). A priority level of a positioning RS may be adapted and/or determined based on one or more predefined conditions. A WTRU may drop or suspend the transmission of a positioning RS (e.g., SRSp), for example, if/when a scheduled transmission of the positioning RS overlaps in time and/or frequency with another transmission (e.g., a UL transmission), and the priority level of the other transmission is higher than the priority level of the positioning RS transmission. In some examples, one or more of following (e.g., configured rules or procedures) may apply. The WTRU may drop or suspend the transmission of a positioning RS that collides or overlaps with a higher priority transmission (e.g., UL data or control transmission), for example, if/when at least one of following conditions is met: an uplink transmission power is limited (e.g., an allocated power for the positioning RS transmission is less than a necessary or required power for transmitting the positioning RS due to simultaneous transmission of the positioning RS and the higher priority transmission); the positioning RS overlaps (e.g., fully overlaps) with the higher priority transmission, for example, in time and/or frequency; the higher priority transmission is of a UL transmission type characterized by short transmission time intervals (short-TTIs) or mini-slots (e.g., the transmission may be based on PUSCH mapping type A).

A priority level of a positioning RS may be changed, updated, or adapted (e.g., increased or decreased) based on one or more conditions. For example, a priority level of a positioning RS may be increased (e.g., with a certain offset) after the positioning RS has been dropped N times (N>0). A WTRU may increase the priority level of a positioning RS (e.g., by K) if the positioning RS has been dropped N consecutive times. N may be a predefined number (e.g., N=4), and may be configured, e.g., via higher layer signaling (e.g., an RRC message). N may be determined based on an initial priority level of the positioning RS, which may be a priority level configured together with other configurations of the positioning RS and/or a default priority level determined, indicated, or used for the positioning RS. K may refer to a priority level increment granularity (e.g., or offset) that may be determined, for example, based on one or more of a predefined number (e.g., K=1), higher layer signaling, an initial priority level of the positioning RS, and/or the like.

A WTRU may increase the priority level of a positioning RS by K, for example, if the positioning RS has not been transmitted during an amount of time $t_{max}$ since the last transmission of the positioning RS. For example, the WTRU may be configured with a timer having a value of $t_{max}$. The WTRU may start (or restart) the timer when the WTRU transmits a positioning RS. The WTRU may use a first priority for the positioning RS while the timer $t_{max}$ is running. The WTRU may use a second priority (e.g., higher) when the timer $t_{max}$ is not running. The value of $t_{max}$ may be configured (e.g., via higher layer signaling), and/or determined as a function of the WTRU's mobility state estimation (MSE) (e.g., the value of $t_{max}$ may be shorter for a higher MSE and longer for a lower MSE).

A WTRU may reset the priority level of a positioning RS to an initial value (e.g., an initial priority level), for example, after the WTRU sends a positioning RS (e.g., if the priority level was increased from the initial value for the transmission). Such an initial value may be the priority level (e.g., initially) indicated or configured (e.g., without any increment that may be caused by consecutive N drops).

A WTRU may not increase or decrease a priority level of a positioning RS if at least one of following conditions is met: the initial priority level of the positioning RS is less than a threshold; if the WTRU is not configured to perform positioning based on an RS sent by the WTRU; and/or if the WTRU is configured with one or more of the following positioning schemes: network-assisted GNSS; Observed time difference of arrival (OTDOA); barometric pressure sensor positioning; WLAN positioning; Bluetooth positioning; terrestrial beacon system positioning; motion sensor positioning; DL-time difference of arrival (TDoA); UL-TDoA; multi-cell round trip time (RTT); DL-angle of departure (AoD); UL-angle of arrival (AoA); Enhanced cell ID (E-CID); and/or the like. For example, if the WTRU is configured to use or determines to use a network-assisted GNSS positioning scheme and/or a UL-TDoA, and an SRSp for the UL-TDoA has been dropped N times (e.g., consecutively), the WTRU may not increase the priority level of a SRSp since the WTRU is also configured to use the network-assisted GNSS positioning scheme.

A priority level associated with a positioning RS transmission may be used interchangeably with a priority level associated with a positioning RS reception (e.g., a priority level configured for a positioning RS transmission may also be used as a priority level for a positioning RS reception). A priority level for positioning RS reception may be used to determine which downlink signal (e.g., a positioning RS signal or a control channel signal) is to be received by a WTRU (e.g., when there is a conflict).

The priority of a reference signal such as a positioning RS may be determined in accordance with the positioning techniques (e.g., methods) employed by a network and/or a WTRU. These positioning techniques (e.g., methods) may include, for example, one or more of the following: OTDOA, DL-TDoA, UL-TDoA, Multi-cell RTT, DL-AoD, UL-AoA, E-CID, and/or the like. One or more of these positioning techniques may utilize a PRS and/or an SRSp, and a WTRU may determine the priority of the PRS and/or the SRSp based on which positioning technique(s) or method(s) is(are) used (e.g., a positioning technique may be used alone (e.g., in part or whole) or in combination with one or more other techniques). The WTRU may receive an indication of the positioning technique(s) or method(s) used by the network, and may determine the priority of a PRS and/or SRSp accordingly. For example, a multi-cell RTT positioning technique may depend on a round trip time estimated based on the time of arrival and departure of reference signals. Thus, a WTRU may determine that a PRS and SRSp used for multi-RTT determination may have a higher priority than a data or control channel, such as the PUCCH, PUSCH, PDSCH and/or PDCCH. As another example, a OTDOA-based positioning technique may (e.g., solely) utilize a PRS, so a WTRU may determine that the PRS used for OTDOA determination may have a higher priority than one or more other channels (e.g., data and/or control channels).

The priority of an RS (e.g., RS for positioning) may be associated with one or more measurements performed by a WTRU or a status of the WTRU. The priority of an RS (e.g., RS for positioning) may be configured for a WTRU based on the measurements or status of the WTRU including, for example, the velocity of the WTRU, an integrity measurement, an alert for integrity, a response time, the acceleration of the WTRU, traffic experienced by the WTRU, a Doppler shift, a Doppler spread, a delay spread, an average delay, a number of multipaths, the time of arrival of a reference signal, the time of departure of a reference signal, a difference between the arrival and/or departure times of different signals, a TDoA, a time stamp (e.g., based on an internal or global clock), an integrity factor, an alert, a K-factor, a traffic status, a discontinuous reception (DRX) status, a time duration of inactivity, an RNTI, positioning-specific information, and/or the like. For example, a WTRU may receive configuration information indicating a high priority for a PRS or SRSp to be received or transmitted by the WTRU, respectively, if any of the foregoing measurements or conditions of the WTRU is above a (e.g., respective) threshold. A high priority may be assigned to a PRS or SRSp, for example, so that positioning accuracy may not degrade.

The priority of an RS (e.g., for positioning) may be associated with one or more RS parameters. These RS parameters may include, for example, one or more of the following: a number of symbols for a SRSp, a muting pattern for a PRS, muting options for a PRS, a periodicity for a PRS or SRSp, a slot offset for periodic transmission of a PRS or SRSp, a time gap between repetitions of a PRS or SRSp, a repetition factor for a PRS or SRSp, a resource element (RE) offset for a PRS or SRSp, a comb pattern for a PRS or SRSp, a spatial relation, and/or the like. A WTRU may determine the priority of an RS (e.g., for positioning) based on one or more of the foregoing parameters. For instance, the WTRU may determine the priority of a PRS or SRSp based on the number of symbols used to transmit/receive the PRS/SRSp (e.g., a PRS or SRSp with a higher number of symbols may be determined to have a higher priority. The WTRU may determine the priority of an RS (e.g., in comparison to other uplink channels or RS's) based on the density of the RS (e.g., the WTRU may prioritize an SRSp transmission over the PUSCH, PUCCH, and/or other uplink reference signals if the WTRU receives configuration information that indicates a high density of the SRSp). The WTRU may determine the priority of an RS based on the spatial relation of the RS with another RS. For example, an SRSp resource and a PRS resource may be related spatially. If one of the PRS or SRSp resource is indicated as having high priority, the WTRU may determine that the other one of the PRS or SRSp resource also has high priority the PRS and SRSp resources are spatially related.

The priority of an RS (e.g., for positioning) may be associated with WTRU mobility. A WTRU may determine the priority of an RS and/or select a prioritization mechanism as a function of the WTRU's mobility (e.g., speed, acceleration, and/or similar). The WTRU may determine that a first positioning reference signal has a first priority if the WTRU's estimated mobility is above a certain threshold and has a second priority if the WTRU's estimated mobility is below the threshold. The WTRU may select (e.g., use) a first prioritization mechanism (e.g., determining a priority based on time, such as discussed herein) if the WTRU's estimated mobility is above a certain threshold and may use a second prioritization mechanism (e.g., determining a priority based on a configured and/or active bearer) if the WTRU's estimated mobility is below the threshold. The mobility of the WTRU may be estimated based on a speed of the WTRU, an acceleration such as sensor-based acceleration of the WTRU, a proximity detection such as sensor-based proximity detection performed by the WTRU, a distance between the WTRU another WTRU and/or object, a range such as communication range of the WTRU, the WTRU's time of stay in a cell, a rate of handover, and/or the like. The threshold may be an aspect of the WTRU's configuration. For example, a WTRU with higher mobility may be configured to transmit or receive a positioning reference signal with a higher priority.

One or more aspects of a WTRU's operation may be configured in accordance with reference signal priorities. For example, a WTRU may be configured to determine the priority of an RS as described herein, a WTRU may be configured to perform measurements and/or reporting in accordance with the priority of an RS, etc. With respect to measurements and reporting, a WTRU may be configured to send reports, alerts, etc. that are related to positioning based on a priority level associated with a positioning reference signal. For example, the WTRU may send one or more reports associated with a positioning measurement (e.g., performed on a PRS) or may send an alert message (e.g., to indicate a positioning related integrity measure) using UL resources that the WTRU may obtain based on a priority associated with the report or alert. The WTRU may be triggered to perform the positioning measurement by an LMF and may send the one or more measurement reports to the LMF. The WTRU may be configured to generate and send the alert (or a warning message) to a network (e.g., to an LMF) in response to detecting an integrity event related to positioning measurement. For example, the WTRU may be configured to send the alert in response to determining that a positioning related error is greater than a threshold. The alert may indicate the detection of the error or event.

A WTRU may be configured to send a measurement report and/or an alert/warning message to an LMF via an NAS message. The WTRU may multiplex other data in an UL transport block that may be assigned the same priority as the priority of the LCH associated with the NAS message. To reduce the latency that may result from the multiplexing (e.g., to ensure that the measurement report and/or alert/warning message be sent on a timely basis such as within an indicated/configured response time duration), a priority level associated with a latency bound may be assigned and applied to the report and/or alert/warning message, for example, during logical channel prioritization (LCP). For example, the WTRU may be configured with a mapping between the priority level of a report or report type (e.g., a measurement, an alert, etc.) and the priority level of an LCH that may carry the report (e.g., an NAS message containing the report). It should be noted here that the priority level associated with a report or report type may be the same as or may be different from the priority level assigned to a PRS measurement. A WTRU may be configured with one or more LCHs associated with a signaling radio bearer (SRB) or a dedicated radio bearer (DRB) and the LCHs may be configured with respective (e.g., different) priority levels. The WTRU may assign an NAS message that includes a measurement report to an LCH based on a configured mapping between the priority of the report and the priority of the LCH (e.g., based on the report and LCH having matching priority levels). The assignment of priority levels to NAS messages (e.g., which may include respective measurement reports) may be performed at a higher layer in the WTRU (e.g., an NAS layer). The mapping between the priority levels of an NAS message and an LCH (e.g., associated with an SRB or a DRB) may be performed at a service data adaptation protocol (SDAP) layer.

In examples, a WTRU may be configured (e.g., semi-statically) with a measurement report priority, for example, via higher layer signalling such as RRC or LPP signaling from a base station (e.g., a gNB) or an LMF, or via lower layer signaling such as DCI or a MAC CE. The WTRU may use a priority associated with a measurement report to determine an UL channel on which to transmit the measurement report. For example, if another transmission (e.g., a PUSCH or PUCCH transmission) overlaps with a PUSCH transmission that includes a measurement report, and the WTRU determines that the other transmission has a lower priority than the PUSCH transmission carrying the measurement report, the WTRU may drop the low priority transmission and transmit the PUSCH with the measurement report.

In examples, a WTRU may be configured to prioritize measurement reports that are associated with a specific cell ID or TRP ID, for example, on a condition that the WTRU is configured to employ certain positioning methods. The cell ID or TRP ID may be associated with a on-demand PRS, or may be a cell ID or TRP ID indicated by an LMF. For instance, on a condition that multi-RTT/AoD is used for positioning, the WTRU may prioritize measurement reports corresponding to a specific cell ID and/or TRP ID. As another example, an LMF may obtain measurement reports (e.g., may instruct a WTRU to send the reports) from a specific cell at a higher priority and/or at a faster report timing.

In examples, a WTRU may determine the priority of a measurement report based on the type of PRSs associated with the measurement. For example, the WTRU may determine that a measurement report associated with an on-demand PRS is to have higher priority than a measurement report associated with a periodic PRS (e.g., a PRS not on demand). As another example, the WTRU may determine the priority of a measurement report based on whether a PRS associated with the report is a periodic PRS, a semi-persistent PRS, or an aperiodic PRS. The WTRU may determine to assign a higher priority to a measurement report associated with an aperiodic PRS compared to a measurement report associated with a periodic PRS. The WTRU may receive a priority indication for a measurement reports as part of a grant configuration (e.g., part of a configured grant or dynamic grant), for example, via an RRC message, a MAC-CE, or DCI from a network entity (e.g., an LMF, a gNB, a RAN, a TRP, etc.).

In examples, a WTRU may determine the priority of a measurement report based on the contents of the report. For example, the WTRU may determine to assign a higher priority to measurement reports that include additional measurements (e.g., measurements per path in multiple times of arrival observed for a PRS resource) compared to measurement reports that include fewer measurements (e.g., a single measurement). In examples, the WTRU may determine to assign a higher priority to measurement reports that include N or more measurements, where N may be a threshold configured by a network (e.g., an LMF).

In examples, a WTRU may determine the priority of a measurement report based on one of more of the following conditions: whether a RSRP of a measured PRS is equal to, greater than, or less than a threshold configured by a network node (e.g., an LMF), whether the quality of measurement (e.g., quality of timing measurement or quality of RSRP) is equal to, greater than, or less than a threshold configured by a network node (e.g., a LMF), whether multiple measurements such as measurements related to a first or main path and/or additional paths, are made using the same Rx beam index (e.g., when more than one path is observed, the measurement report may have a higher priority since the report may include multipath measurements that may provide additional information to an LMF), whether the measurement report includes location information (e.g., for WTRU-based positioning), and/or the like.

A WTRU may be configured (e.g., pre-configured) with multiple PRS or SRSp configurations (e.g., for low latency PRS's or SRSp's), and each PRS or SRSp configuration may be associated with a priority. The WTRU may select a PRS/SRSp configuration from the multiple configurations based on an associated priority level. The WTRU may be configured with one or more resource pool configurations for PRS reception and/or SRSp transmission, and the resource pool configurations may be associated with respective (e.g., different) priority levels. The WTRU may be configured with one or more PRS and/or SRSp resource pool configurations for each priority level. The WTRU may select (e.g., based on configured criteria) a configuration for performing measurement of a PRS and/or transmission of an SRSp based on a received indication of a priority level associated with the PRS/SRSp configuration.

Using DL PRS reception and measurement as an example, the WTRU may receive an indication (e.g., in an LPP or NAS message, a dedicated RRC message, a SIB, a DL MAC CE, etc.) from a network entity (e.g., an LMF or a serving gNB (e.g.) that the WTRU is to initiate a PRS measurement. The WTRU may also receive (e.g., in the same message) a priority level associated with low latency PRS measurement and/or reporting. The WTRU may select a PRS configuration (e.g., from a set of configurations for measurement) with an associated priority level that matches the priority level received by the WTRU (e.g., for PRS low latency measurement and/or reporting). For UL SRSp transmissions, the WTRU may receive an indication from a network entity such as a serving gNB that indicates that the WTRU is to initiate the transmission of an SRSp. The WTRU may also receive (e.g., in the same message) a priority level associated with low latency SRSp transmissions. The WTRU may select an SRSp configuration (e.g., from a set of configurations) with an associated priority level that matches the priority level received by the WTRU.

A WTRU may be configured to associate a different priority level with a periodic PRS from the priority associated with an on-demand PRS. In examples, the WTRU may be configured with a higher priority for an on-demand PRS and a lower priority level for a periodic PRS. The WTRU may prioritize an on-demand PRS and drop (e.g., not monitor) a periodic PRS, for example, if there are overlapping PRS transmissions. In examples, the WTRU may be configured to give a higher priority to a periodic PRS and a lower priority level to an on-demand PRS. In examples, an on-demand PRS may be a periodic PRS, a semi-persistent PRS, or an aperiodic PRS. If an on-demand PRS is also a periodic PRS and the on-demand periodic PRS collides with another period PRS such as a non-on-demand periodic PRS, the WTRU may be configured to prioritize the on-demand periodic PRS over the non-on-demand periodic PRS. In examples, a WTRU may request (e.g., from a network) an on-demand periodic PRS that has a different frequency density (e.g., a comb value) than a (e.g., non-on-demand) periodic PRS that the WTRU is currently configured to receive. The WTRU may receive an indication from the network that the on-demand periodic PRS has a higher priority than the other periodic PRS. If the on-demand periodic PRS and the other periodic PRS collide (e.g., in a symbol or slot), the WTRU may prioritize the reception of the on-demand periodic PRS over the other periodic PRS, and may perform measurements on the on-demand periodic PRS. If the WTRU receives an indication from the network that the on-demand periodic PRS has a lower priority than a data or control channel transmission (e.g., a PDSCH or PDCCH transmission) and the on-demand periodic PRS and the data or control channel transmission collide (e.g., in a symbol or slot), the WTRU may prioritize the reception of the data or control channel transmission over the on-demand periodic PRS transmission, and may not perform measurements on the on-demand periodic PRS.

A WTRU may be configured to perform an LCP procedure in association with interrupting, suspending, and/or resuming a transmission. The WTRU suspend or resume DL data reception, for example, when measuring a prioritized PRS. In examples, the WTRU may (e.g., be triggered to) suspend the reception of DL data in one or more LCHs for a duration (e.g., for a period of time) such as when the WTRU is performing measurement of a prioritized DL PRS. The WTRU may suspend DL data reception (e.g., during a measurement gap) during PRS reception and/or measurement, for example, if the PRS is associated with a priority level higher than the priority of the DL data (e.g., one or more impacted LCHs associated with the DL data). The WTRU may be provided with a resource assignment and/or DL data (e.g., PDCCH and/or PDSCH data) prior to performing reception and/or measurement of a PRS, for example, if one or more LCHs are associated with a higher priority than the priority associated with the PRS. The WTRU may suspend data reception for the duration of a PRS measurement if an LCH associated with the data reception has a priority level that is lower than or equal to the priority level associated with the PRS. The WTRU may receive (e.g., from a network) an indication of a response time for performing a PRS measurement and/or a positioning related measurement reporting to the network, and the WTRU may suspend DL data reception for a duration associated with the response time (e.g., within the response time).

A WTRU may receive a trigger for performing a PRS measurement from a network (e.g., a serving gNB), for example, based on the serving gNB receiving a WTRU positioning request message from an LMF. The serving gNB may forward the positioning request message to the WTRU and may indicate the suspension of DL data reception and initialization of PRS measurement, e.g., for a time duration associated with the PRS measurement and reporting. The WTRU may receive a resource assignment and data prior to receiving the indication to initialize PRS measurement. The WTRU may decode the data if the priority associated with the data is greater than the priority of the PRS. The WTRU may (e.g., directly) transition to performing the PRS measurement (e.g., suspend the data reception and/or decoding) if the priority associated with the data is less than or equal to the priority of the PRS.

A WTRU may receive a trigger (e.g., an indication) for performing a PRS measurement in a higher layer message. In response, the WTRU may send an indication to a network indicating that the WTRU is to initiate DL PRS reception and/or measurement, and to suspend DL data reception. In examples, the trigger may be received in an NAS message sent by an LMF, which may include an LPP request for location information. In examples, the trigger may be received from a higher layer of the WTRU based on an integrity related measurement threshold being met. For instance, the WTRU may send an indication to the network to request a PRS (e.g., for measurement) if the priority level associated with the PRS measurement is greater than or equal to a configured threshold. Such an indication may be included, for example, in UCI, in a UL MAC CE, or in an RRC message. The indication may include a priority value, which may be determined, for example, using a configured mapping between the priority of the PRS measurement and a priority level that triggers the transmission of the UCI (e.g., SR) or the UL MAC CE. The WTRU may indicate such a priority (e.g., the priority of the PRS or the priority level that triggers the transmission of the UCI or MAC CE) to the network (e.g., a gNB) since the configuration(s) related to the priority of the PRS may be provided by a network entity such as the LMF and may thus be transparent to the gNB. The WTRU may (e.g., after sending the indication to the network) perform a PRS measurement in accordance with a configured measurement procedure. The WTRU may (e.g., directly or in response to receiving an indication from ae serving gNB) transition to receiving DL data upon completion of the PRS measurement and generation of the measurement report (e.g., within a certain response time duration).

A WTRU may suspend and/or resume UL data transmission during a time period when the WTRU is sending a prioritized SRSp. The WTRU suspend tasks associated with resource scheduling and data transmission (e.g., for the data in one or more LCH buffers) during the time period. The WTRU may suspend the UL data transmission on a condition that an SRSp transmission is associated with a priority level higher than the priority of the UL data (e.g., the priority of one or more impacted LCHs). The WTRU may be configured (e.g., by a network) with a mapping between a priority associated with an SRSp and a priority associated with one or more LCHs. The WTRU may use the configured priority mapping to determine the LCH(s) (e.g., with data in a buffer) that are to be transmitted prior to the transmission of a SRSp or suspended during the transmission of the SRSp in the UL. The WTRU may (e.g., for certain LCHs with an assigned priority level higher than the priority associated with a SRSp) apply an LCP procedure for requesting UL grants. For example, the WTRU may send an SR and/or BSR to a network, and/or may transmit UL data prior to transmitting a SRSp. The WTRU may (e.g., for LCHs with a priority level lower than or equal to the priority associated with a SRSp) suspend the data transmission for the duration of an SRSp transmission.

A WTRU may receive an indication for suspending UL data transmission and/or for transmitting a SRSp from a network (e.g., a serving gNB). The indication may be provided by the serving gNB, for example, based on a WTRU positioning request message received by the gNB from an LMF. The WTRU may receive the indication in DCI, in a DL MAC CE, in an RRC message, etc. The indication may include one or more of the following: an indication to activate a pre-configured SRSp resource configuration (e.g., the activation indication may include an identifier associated with a pre-configured SRSp resource configuration), timing information associated with the transmission of a SRSp (e.g., such timing information may include a number of transmissions, a time duration for the SRSp transmission, and/or a periodicity of transmission for periodic SRSp transmission), and/or information associated with UL data transmission suspension. For example, the indication may include an instruction for suspending UL data transmission for the duration of an SRSp transmission or for one or more selected LCHs. The indication may include the identifiers of the LCHs that are to be suspended and/or the time duration (e.g., per-LCH) in which data transmission is to be suspended. The indication may include one or more updated LCH parameters (e.g., priority, packet delay budget (PDB), etc.) that may be applied by the WTRU to determine the LCHs that may be suspended when the WTRU is transmitting an SRSp.

A WTRU may receive a trigger (e.g., an indication) for suspending UL data transmission and/or transmitting an SRSp from a higher layer (e.g., a higher layer component) in the WTRU, for example, based on the detection of an application level or integrity related measurement threshold being met. The WTRU may indicate to the network an initialization of an SRSp transmission, for example, by sending an indication to a serving gNB. The indication may be included in UCI (e.g., PUCCH), a UL MAC CE, or an RRC message. The may include, for example, one or more of a request to activate an SRSp resource configuration, an indication that an SRSp resource configuration has been activated, and/or an update to a UL resource request. The WTRU may request an SRSp configuration (e.g. a new SRSp configuration), for example, if the WTRU is not configured with an SRSp resource configuration and/or the WTRU detects (e.g., the WTRU may be configured to do so) a higher layer trigger for transmitting an SRSp that has an associated priority above a certain priority threshold. The WTRU may be configured with one or more SRSp resource configurations, where the different configurations may be associated with different priority levels. The WTRU may request the activation of an SRSp configuration, for example, based on the priority associated with a detected higher layer trigger (e.g., for transmitting an SRSp) and a configured mapping between the priority and the SRSp configuration. For example, the WTRU may receive information regarding the association between a priority and an SRSp configuration from the network (e.g., LMF). The WTRU may receive a trigger from the network (e.g., LMF) to send an SRSp with a certain priority (e.g., the highest priority). The WTRU may (e.g., subsequently) send a request to the network (e.g., to a base station or gNB) to activate an SRSp that corresponds to the priority. In the request, the WTRU may include the configuration for the SRSp and/or may indicate the priority of the SRSp configuration based on the aforementioned mapping. With respect to the update to a UL resource request that may be included in the indication sent by the WTRU to the network, the WTRU may have already sent a scheduling request (SR) or a buffer status report (BSR) to the network, and may or may not have received a UL grant associated with the SR or BSR. Now, due to the suspension of UL data transmission for purposes of transmitting an SRSp, the WTRU may send an update to the network, for example, to cancel or update the previously transmitted SR and/or BSR.

A WTRU may resume a suspended LCH (e.g., which may have data in a buffer ready for transmission) if a criterion is satisfied, such as when a time duration of the suspension (e.g., due to an SRSp transmission) becomes less than or equal to a PDB associated with the LCH. The WTRU may (e.g., upon completing an SRSp transmission within an SRSp transmission duration and/or after a criterion for the suspension has been satisfied) trigger (e.g., send) an SR and/or BSR to request resources for performing a UL data transmission, for example, in accordance with a pre-suspension LCP procedure. The WTRU may drop a data PDU in a buffer and/or indicate to a higher layer that the data PDUs has been or is to be dropped if a criterion (e.g., a PDB) for ending the UL data transmission suspension is not satisfied.

The priority of a positioning reference signal may be determined based on (e.g., as a function of) the priority and/or QoS associated with a DRB. For example, a WTRU may determine that a PRS has a first priority if there is at least one radio bearer configured with a priority equal to or above a certain value or threshold, and that the PRS has a second priority if such a radio bearer does not exist. When making this determination, the WTRU may consider (e.g., only) radio bearers (e.g., DRBs) that have been active in transmission within a certain time period. The time period and/or the threshold may be aspects of the WTRU's configuration. For example, the WTRU may determine that one or more positioning reference signals have a higher priority if the WTRU is configured with and/or is actively transmitting information using at least one DRB (e.g., for URLLC), and that the one or more positioning reference signals have a lower priority if the WTRU is not configured with or is not actively transmitting using a DRB (e.g., for URLLC).

A WTRU may be configured with rules for prioritizing (or de-prioritizing) the transmission and/or reception of a positioning RS over another transmission (e.g., a transmission over an uplink channel), for example, based on respective priorities associated with the positioning RS and the other transmission (e.g., the other transmission may be scheduled with a specific priority). The positioning RS may include a DL RS (e.g., a PRS) or a UL RS (e.g., an SRSp). For example, the WTRU may be configured to prioritize between a PRS reception and a PUCCH transmission, or between an SRSp transmission and a PDSCH reception. Such prioritization may be performed for one or more symbols or slots (e.g., flexible symbols or slots) that allow uplink and downlink transmissions.

A WTRU may receive configuration information that indicates the priority of a positioning RS. The WTRU may receive the configuration information semi-statically, along with an RRC configuration of the positioning RS, or through another signaling mechanism such as a MAC CE or DCI. A WTRU may determine a priority associated with a positioning RS based on the transmission time of the positioning RS and/or the transmission time of a measurement report. For example, the WTRU may be configured with a set of one or more UL and/or DL slots or symbols, during which the transmission or reception of a positioning RS may be considered as having a high priority (e.g., or be associated with a specific priority). Such symbols or slots may be configured, for example, using a bitmap that represents the symbols or slots and/or a periodicity at which the symbols or slots are to repeat. For instance, a value of 1 in the bitmap may indicate a high priority positioning RS transmission/reception (e.g., or a positioning RS transmission/reception with a specific priority) in a symbol or slot. The WTRU may be configured with a set of priority configurations (e.g., bitmaps) and may later receive an indication (e.g., via DCI) of which priority configuration (e.g., bitmap) is applicable, for example, during a specific time period. In some examples, different priority configurations (e.g., bitmaps) may be associated with different priority levels or values. For instance, Table 1 below illustrates that a value of "1" may indicate a priority level of p1 in some priority configurations (e.g., first and second rows or configurations shown in Table 1) while the value of "1" may indicate a different priority level (e.g., p2) in other priority configurations (e.g., third row or configuration shown in Table 1). Using the example mechanism in Table 1 for configuring positioning RS priorities, the priority of a positioning RS may be determined based on the reception or transmission time of the positioning RS (e.g., based on the slot(s) or symbol(s) in which the positioning RS is received or transmitted).

TABLE 1

Example configuration of positioning RS priorities

| | Slot number | | | | | | | | | |
|---|---|---|---|---|---|---|---|---|---|---|
| | 0 | 1 | 2 | 3 | 4 | 5 | 6 | 7 | 8 | 9 |
| First configuration with priority p1 | 1 | 0 | 0 | 1 | 1 | 1 | 0 | 0 | 0 | 1 |
| Second configuration with priority p1 | 0 | 1 | 0 | 0 | 1 | 1 | 1 | 0 | 0 | 0 |
| Third configuration with priority p2 | 1 | 1 | 1 | 0 | 0 | 0 | 1 | 1 | 1 | 1 |

A WTRU may be configured to associate a high priority with a PRS or SRSp measurement report transmitted during a downlink reference (DRS) window. For example, the WTRU may be configured (e.g., in unlicensed operation) with a DRS window, during which an SSB, PRS and/or system information (SI) may be broadcasted. A network (e.g., a gNB) may use a prioritized channel access method or mechanism (e.g., such as listen before talk (LBT)) to transmit a DRS signal (e.g., such as a PRS), and the WTRU may drop other transmission(s) and prioritize the reception of the DRS signal (e.g., the PRS).

A WTRU may be configured to prioritize between a positioning RS and another transmission (e.g., a PUCCH or PUSCH transmission). For example, the WTRU may be configured to prioritize between a positioning RS transmission and a PUCCH transmission based on preconfigured prioritization rules or based on respective priorities associated with (e.g., indicated for) the transmissions. The WTRU may determine the priority of the positioning RS using one or more of the techniques described herein. The WTRU may determine the priority of the PUCCH (or PUSCH) transmission based on configurations, rules or policies provided by the network. The WTRU may compare the priorities indicated for various transmissions and drop/suspend/delay the transmission that has a lower priority. The priority values of the various transmissions may be configured in an ascending order (e.g., higher values indicate higher priorities) or in a descending order (e.g., higher values indicate lower priorities). The WTRU may be configured with different priority comparison scales for different types of signals. For example, a first comparison scale may be configured and used to compare the priorities of a PUSCH transmission and a positioning RS transmission, and a second comparison scale may be configured and used to compare the priorities of a PUCCH transmission and a positioning RS transmission. For example, a PUSCH transmission may have a potential priority value among $p_1$, $p_2$, $p_3$, and $p_4$ and an SRSp transmission may have a potential priority value among $p'_1$, $p'_2$, and $p'_3$. The WTRU may be configured with a mapping rule, table, function, etc., f(.), that may map a priority from the first set of priorities $\{p_1, p_2, p_3, p_4\}$ to a priority from the second set of priorities $\{p'_1, p'_2, p'_3\}$ (e.g., to translate the values from a first scale to a second scale). The WTRU may (e.g., upon applying the mapping) compare the priority values associated with the PUSCH transmission and the SRSp transmission, and determine which transmission to drop based on the comparison. As another example, a PUCCH transmission may have a potential priority of $p_1$ or $p_2$, and an SRSp transmission may have a potential priority of $p'_1$, $p'_2$, or $p'_3$. The WTRU may be configured with a mapping rule, table, function, etc., g(.), that may map a priority from the first set of priorities $\{p_1, p_2\}$ to a priority from the second set of priorities $\{p'_1, p'_2, p'_3\}$ (e.g., to translate the values from a third scale to a fourth scale). The WTRU may (e.g., upon applying the mapping) compare the priority values of the PUCCH transmission and the SRSp transmission, and determine which transmission to drop based on the comparison. The mapping rule, table, function, etc. may be configured for or otherwise indicated to the WTRU, for example, semi-statically (e.g., the rule, table, or function may be updated) or statically (e.g., the rule, table, or function may be fixed).

A WTRU may prioritize an SRSp transmission over other data or control channel transmission(s) or over other uplink reference signal transmission(s). These other data, control, or reference signal transmission(s) may include, for example, PUCCH, PUSCH, DMRS, PTRS, and/or SRS transmissions that may overlap with the SRSp transmission in time and/or frequency resources. In an example scenario, the WTRU may prioritize the transmission of the SRSp over the other transmission(s) in response to determining that the SRSp transmission has a higher priority than the other transmission(s). The WTRU may, in this example scenario, perform at least one of the following actions: the WTRU may partially perform the other transmission(s) and perform the SRSp transmission; the WTRU may drop (e.g., entirely) the other transmission(s) and perform the SRSp transmission; the WTRU may perform the SRSp transmission and delay the other transmission(s) (e.g., by a preconfigured number of symbols, slots, or frames).

A WTRU may prioritize a PRS reception over other data or control channel reception(s) or over other downlink reference signal reception(s). These other data, control, or reference signal reception(s) may include, for example, PDCCH, PDSCH, and/or CSI-RS reception(s), and may overlap with the PRS reception in time and/or frequency resources. In an example scenario, the WTRU may prioritize the PRS reception over the other reception(s), for example, in response to determining that the PRS reception has a higher priority than the other reception(s). A WTRU may, in this example scenario, perform at least one of the following actions: the WTRU may receive the PRS and partially drop the other reception(s); the WTRU may receive only the PRS; the WTRU may receive the PRS and the other signal(s), but may delay the other receptions (e.g., by a preconfigured number of symbols, slots, or frames).

In examples, a WTRU may be configured with a priority associated with a measurement gap (MG). If the WTRU is configured with an UL transmission or a DL reception that overlaps with the measurement gap, the WTRU may use the MG priority to determine whether to measure a reference signal such as a DL PRS during the configured MG or to perform the UL transmission or DL reception. The WTRU may compare the priority associated with the MG and the priority associated with UL transmission/DL reception to determine whether to the measure the reference signal (e.g., the DL PRS) during the measurement gap or to perform the UL transmission or DL reception. In examples, if the priority associated with the MG is higher than the priority associated with the overlapping UL transmission/DL reception, the WTRU may drop the UL transmission/DL reception.

A WTRU may determine (e.g., select) an applicable muting pattern (e.g., of one or more reference signals such as a PRS) based on a priority level. Muting (e.g., of a reference signal) may be performed statically or dynamically, and may be configured based on the priority of the signal associated with the muting. Muting may be defined or configured at a resource and/or resource set level. A muting configuration or multiple muting configurations may be defined for an RS transmitted or received in different resources at a same priority level. For example, multiple muting configurations may be defined for a PRS of a certain priority in accordance with the periodicity of unmuted PRS transmissions. Under a first muting pattern, the WTRU may receive an unmuted PRS transmission associated with a high priority every 10 ms. Under a second muting pattern, the WTRU may receive unmuted PRS transmissions associated with the high priority every 1 ms.

Muting may be applied to the transmission of an SRSp and/or a PRS, and a pattern of the muting may be defined, for example, using a bitmap, which may indicate whether an SRSp or a PRS is transmitted in a resource or resource set during periodic transmissions of the SRSp or PRS. For example, a bitmap of [1101] may indicate that a third instance of the PRS or SRSp is not transmitted (e.g., is muted). Periodic transmissions of a PRS or an SRSp may have one or more of the following characteristics: the PRS or SRSp transmissions may be repeated on a resource set basis (e.g., the PRS or SRSp may be transmitted in all resources of a resource set at a configured repetition factor or periodicity; and/or the PRS or SRSp transmissions may be repeated on an individual resource basis (e.g., the PRS or SRSp may be transmitted in multiple resources based on a configured repetition factor or periodicity). The repetition periodicity and/or repetition factor may be configured, for example, by a higher layer entity. For example, the repetition periodicity and/or repetition factor may be configured by an LPP and/or via RRC signaling for the PRS and/or SRSp transmissions. A parameter, such as a time gap, may be configured to separate the repetitions of transmission in the time domain. The periodicity, repetition factor, and/or time gap may be configured as a part of a PRS or SRSp resource configuration.

A muting pattern for an SRSp or a PRS may be defined or determined in various (e.g., two) ways or using various (e.g., two) options. For example, in a first way (e.g., option A), muting may be applied to preconfigured (e.g., consecutive) instances of a resource set, and in a second way (option B), muting may be applied based on the repetition indices of resources (e.g., DL-PRS resources) within a resource set (e.g., a DL-PRS resource set). The various ways or options (e.g., option A and option B) for applying muting may be combined, for example, by performing a logical AND operation on the options.

A WTRU may (e.g., dynamically) determine a muting pattern of a reference signal (e.g., an SRSp and/or a PRS). In some examples, the WTRU may determine a muting pattern of reference signal transmissions or receptions (e.g., SRSp transmissions and/or PRS receptions) based on one or more (e.g., any combination) of the following: the transmission/reception of the reference signal in the last one or multiple reference signal resources; the priority level associated with a reference signal resource or a resource set to which the reference signal resource belongs; the integrity of a corresponding positioning service; the latency of a corresponding positioning service; and/or the like.

A WTRU may determine a muting pattern of a reference signal such as a positioning reference signal based on the transmission/reception of the reference signal in one or more previously scheduled reference signal resources (e.g., positioning reference signal resources). For example, the WTRU may determine a muting pattern of a PRS based on the WTRU's reception of a PRS or the WTRU's transmission of an SRSp in one or multiple previous reference signal resources. For example, the WTRU may determine that an SRSp transmission was cancelled or postponed in a previous transmission resource due to interference or conflict with a scheduled uplink data or control channel transmission. The SRSp transmission may (e.g., at least when the RTT method is used) be associated with a PRS transmission and may be transmitted within a preconfigured time interval since the reception of the PRS, for example, in order to calculate an RTT. Thus, the WTRU may determine the muting pattern of the PRS such that the WTRU may transmit the SRSp within the preconfigured time window from the reception of the PRS. The WTRU may change (e.g., from a current muting pattern) to another muting pattern that provides a PRS transmission sooner (e.g., at the earliest time) if the WTRU detects that a PRS is deprioritized in the current PRS resource. The WTRU may determine a muting pattern of an SRSp based on the WTRU's reception of a PRS and/or the WTRU's transmission of an SRSp in one or more previous reference signal resources. For example, the WTRU may determine that the reception quality of a PRS is below a preconfigured threshold (e.g., an RSRP is below a preconfigured threshold). Based on the reception quality of the PRS, the WTRU may determine (e.g., select) a muting pattern for SRSp's such that unmuted SRSp transmissions are performed less frequently to avoid unnecessary computation of the difference between the reception time of the PRS and the transmission time of the SRSp at the WTRU. The WTRU may change a present muting pattern to a default pattern (e.g., no muting) if the reception quality of the PRS is above the preconfigured threshold (e.g., the RSRP is above a preconfigured threshold). The WTRU may change (e.g., from a current SRSp muting pattern) to another SRSp pattern that may not provide an SRSp resource in a time period, for example, if the PRS in that time period is de-prioritized. This approach may support an RTT-based positioning operation, where the WTRU may not transmit an SRSp if an associated PRS is de-prioritized. The WTRU may be configured to not transmit an SRSp in a muted SRSp resource. The WTRU may be configured to assume that no PRS is transmitted in a muted PRS resource.

Figure 4:
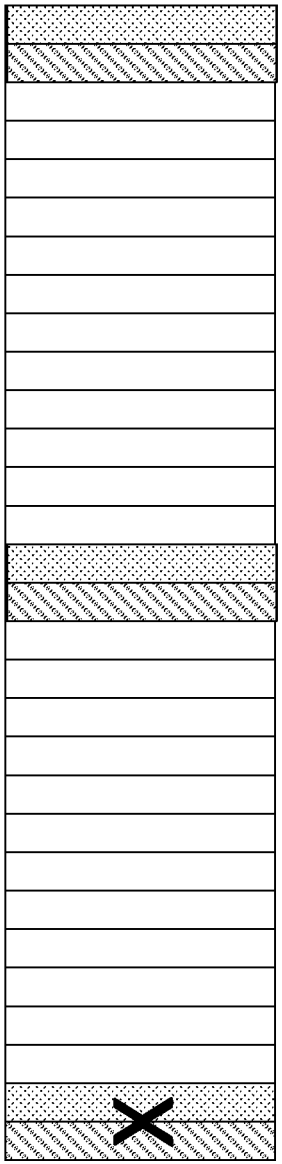
FIG. 4 illustrates an example of a WTRU changing a muting pattern based on PRS reception activities in a reference signal resource.
Figure 4:
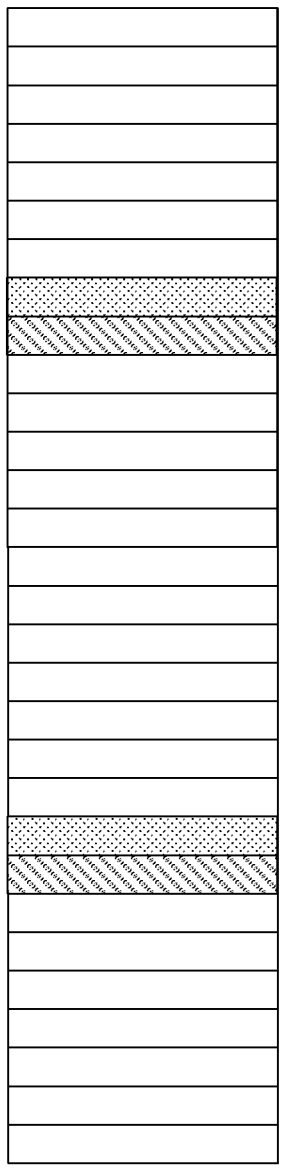
Figure 4:
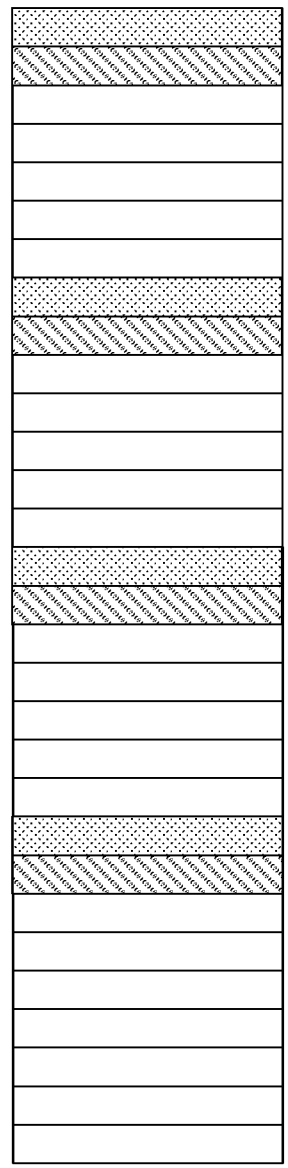

A WTRU may determine a muting pattern of a reference signal (e.g., an SRSp and/or a PRS) based on a priority of the reference signal and/or the reception activity of the reference signal in a previous time period (e.g., using a previous time resource). FIG. 4 illustrates an example of a WTRU changing a muting pattern based on the reception activity of a PRS in a previous reference signal resource (e.g., time resource). The different shades in FIG. 4 may indicate different PRS resources (e.g., PRS beams). For example, a base station (e.g., a gNB) or a TRP may transmit two different PRS beams over two consecutive symbols, e.g., a first beam in a first symbol (e.g., PRS resource A) and a second beam in a second symbol (e.g., PRS resource B). As shown in the figure, the WTRU may be configured to use muting pattern 1 (e.g., by default), and a PRS transmission according to muting pattern 1 may be de-prioritized in a time period (e.g., a time resource), for example, due to the prioritization of another transmission/reception over the PRS transmission. In response, the WTRU may switch to muting pattern 2 or muting pattern 3 based on a priority associated with the PRS. For example, the WTRU may decide to use muting pattern 2 if the priority associated with the PRS is higher than a threshold and use muting pattern 3 if the priority associated with the PRS is lower than or equal to the threshold. Similar approaches or techniques may be applied to SRSp muting. For example, the WTRU may determine a muting configuration (e.g., a muting pattern) of an SRSp based on the priority level of the SRSp. Such a priority level may be indicated, for example, by RRC signaling, via a MAC-CE or DCI, or implicitly using one or more techniques disclosed herein. In some examples, the WTRU may determine a muting configuration (e.g., a muting pattern) of an SRSp based on the priority level of a PRS, which may be spatially associated with the SRSp.

Figure 5:
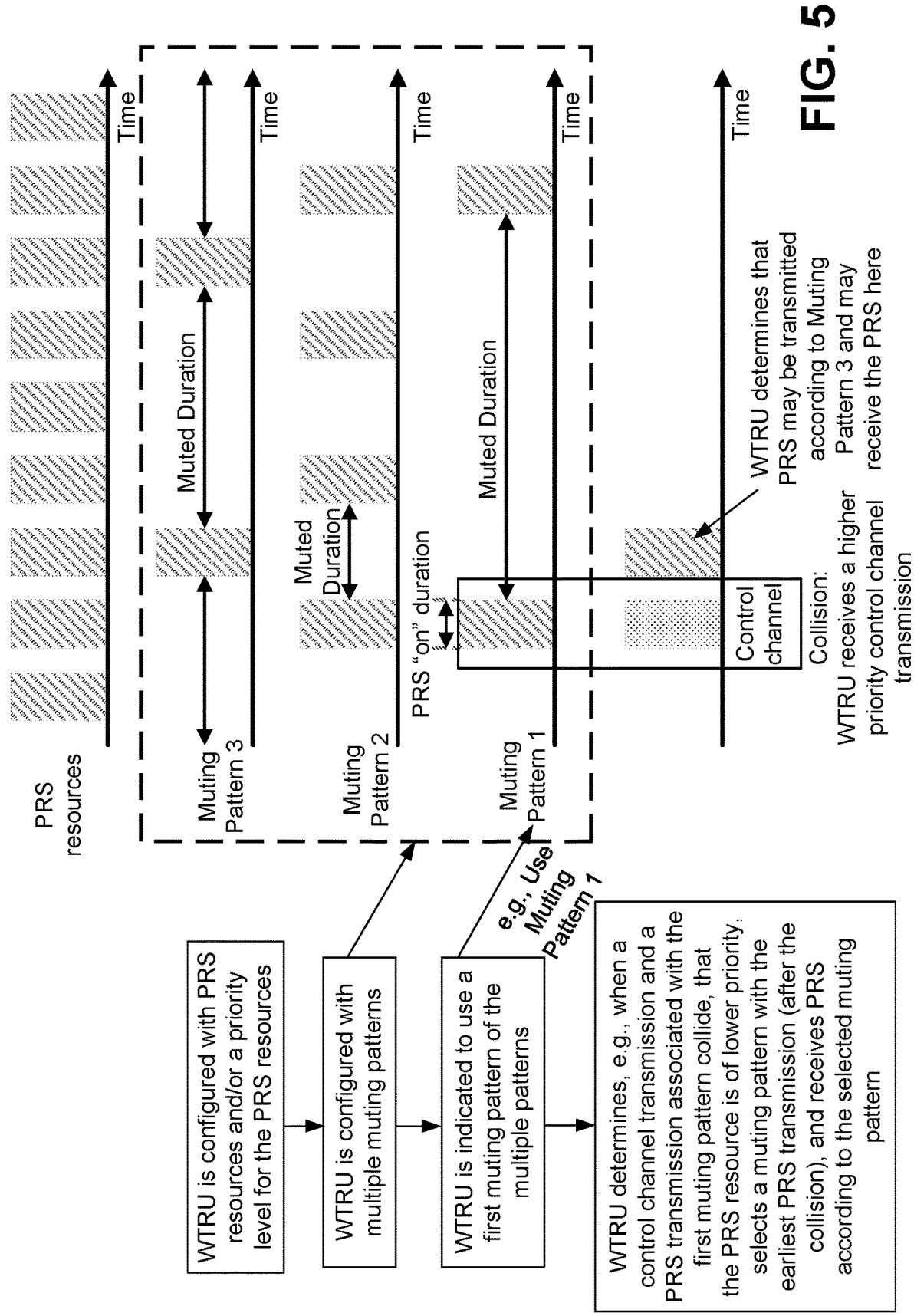
FIG. 5 illustrates an example of a WTRU changing a muting pattern based on the deprioritization of a positioning reference signal resource.

FIG. 5 illustrates an example of a WTRU changing a present muting pattern of a reference signal (e.g., a PRS) to a different muting pattern in response to deprioritization of the reference signal (e.g., deprioritization of one or more PRS resources such as DL-PRS resources). As shown, a WTRU may be configured with multiple muting patterns (e.g., muting patterns 1-3), PRS resources, and/or respective priority levels associated with the PRS resources. The WTRU may be indicated (e.g., via an RRC configuration message, a DCI command, etc.) to use a first muting pattern (e.g., muting pattern 1). While operating in according with the first muting pattern, the WTRU may determine that one or more PRS transmissions (e.g., DL-PRS resources) associated with the first muting pattern may be deprioritized (e.g., due to a collision with another DL reception or UL transmission). In response, the WTRU may determine to switch to a second muting pattern (e.g., muting pattern 3), for example, based on a determination that the second muting pattern may be associated with (e.g., may provide) the earliest PRS transmission (e.g., earliest scheduled DL-PRS transmission resource) among the multiple configured muting patterns (e.g., including the first muting pattern) after the de-prioritization of the PRS (e.g., due to collision).

In the example of FIG. 5, the WTRU may determine that the PRS transmission associated with the first muting pattern (e.g., muting pattern 1) is to collide with a control channel (e.g., PDCCH) transmission in a first time resource, and the WTRU may decide to receive the control channel transmission instead of the PRS transmission in response to determining that the control channel transmission has a higher priority than the PRS transmission. The WTRU may make this determination, for example, based on respective priorities associated with the control channel transmission and the PRS transmission or based on a configured collision avoidance rule/policy. The WTRU may select, based on the configured muting patterns (e.g., muting patterns 1-3), a second time resource that corresponds to the earliest unmuted PRS transmission after the control channel transmission. For example, the WTRU may select the second time resource according to the second muting pattern (e.g., muting pattern 3) upon determining that this time resource may correspond to the earliest unmuted PRS transmission among all configured muting patterns (e.g., muting patterns 1, 2 and 3). The WTRU may use the second time resource to receive the unmuted PRS transmission and may continue to use the second muting pattern afterwards.

Muting patterns of reference signals may be dynamically configured, for example, by DCI or an MAC-CE. Each muting pattern may be associated with a respective priority level. A WTRU may determine a muting pattern based on a received DCI or MAC-CE. The DCI or MAC-CE may include an indication of which muting pattern is applicable (e.g., configured and/or activated). Such an indication may be, for example, a priority level associated with a muting pattern and/or an index associated with a muting pattern. The indication may include a flag (e.g., 1 or 0) indicating whether muting or a muting pattern is turned on or off (e.g., if only one muting pattern is configured for PRS or SRSp transmissions).

A muting configuration or muting pattern may be associated with a priority level. In some examples, a WTRU may be configured to apply a muting pattern of a reference signal depending on a priority level associated with the reference signal (e.g., a PRS or SRSp). The WTRU may apply a configured muting pattern to an SRSp, for example, if the WTRU receives configuration information indicating that the priority level of the SRSp (e.g., configured for the WTRU) is low. Such a priority level may be configured for a PRS/SRSp resource, a PRS/SRSp resource set, a TRP, and/or a frequency layer. The priority level (e.g., indicated for the PRS/SRSp resource, resource set, TRP, or frequency layer) may imply that a muting pattern associated with the priority level is applicable to the PRS/SRSp resource, resource(s) in the resource set, resource set(s) associated with the TRP, or TRP(s) associated with the frequency layer. In examples, the WTRU may be configured with multiple muting patterns and each muting pattern may correspond to a respective (e.g., different) priority level (e.g., high, medium or low) and/or index (e.g., 0, 1, . . . 9). For example, the WTRU may receive a priority indication from a gNB or LMF for a TRP and the WTRU may assume that a muting pattern corresponding to the priority indication is applicable to PRS resource(s) or PRS resource set(s) (e.g., all the PRS resources and PRS resource sets) associated with the TRP.

In some examples, a WTRU may receive a configuration indicating that the priority level of a PRS configured for the WTRU is low, and may determine that a specific muting pattern is applicable to the PRS. In some examples, a WTRU may determine a muting pattern for a PRS based on PUSCH, SRSp, and/or SRS configuration information. The WTRU may determine a muting pattern for SRSp, for example, based on PDSCH or downlink RS configuration information.

In some examples, a WTRU may be configured by the network (e.g., by an LMF, a gNB, etc.) with a measurement gap during which the WTRU may receive a PRS transmission (e.g., using a PRS resource) with or without a muting pattern associated with the PRS. If the WTRU operates with a same muting pattern (e.g., such as a default or initial muting pattern), the WTRU may not need to request the network to reconfigure a previously configured measurement gap. If the WRU determines to change a present muting pattern (e.g., when a PRS associated with the muting pattern is de-prioritized, as described herein), and the waiting period for the WTRU to receive the next earliest PRS transmission (e.g., according to a new muting pattern) exceeds a threshold (e.g., a preconfigured threshold), the WTRU may send a request to the network to reconfigure a previously configured measurement gap or to remove the previously configured measurement gap such that the WTRU may receive other transmission(s) (e.g., PDCCH and/or PDSCH transmission) while waiting for the next earliest PRS transmission. The reconfiguration may be related to, for example, a duration of the measurement gap, a periodicity of the measurement gap, a repetition period associated with the measurement gap, etc. The WTRU may send such a reconfiguration or removal request to the network via LPP or RRC signaling, through an MAC-CE or UCI, etc. The WTRU may request the network to restore (e.g., reactivate) a measurement gap that was configured for the WTRU before the WTRU sent the reconfiguration or removal request, or the WTRU may request the network to provide the WTRU with a default measurement gap, for example, once the WTRU expects to receive a PRS transmission (e.g., when the waiting period for the next earliest PRS transmission falls below the preconfigured threshold).

In some examples, a WTRU may not receive a measurement gap configuration from the network (e.g., an LMF, a gNB, etc.). The WTRU may receive a PRS configuration from the network indicating that the WTRU is to receive a PRS without a measurement gap. This may (e.g., implicitly) indicate that the WTRU may change muting patterns dynamically and/or may receive other transmission(s) (e.g., PDCCH and/or PDSCH transmsision) and PRS transmission(s) in one or more non-overlapping time resources (e.g., symbols, slots, etc.). In some examples, the WTRU may receive an explicit indication from the network indicating that the WTRU is not configured with a measurement gap and that the WTRU may determine to change muting patterns dynamically and/or may receive other transmission(s) (e.g., PDCCH and/or PDSCH transmissions) and PRS transmission(s) in non-overlapping time resources (e.g., symbols, slots, etc.). The WTRU may (e.g., subsequently) receive a measurement gap configuration from the network, after which the WTRU may receive PRS transmission(s) but not other transmission(s) (e.g., PDCCH and/or PDSCH transmissions) during the configured measurement gap.

A WTRU may be configured with one or more of the following behaviors after switching muting patterns. The WTRU may receive reference signal (e.g., PRS) transmissions (e.g., including muted PRS transmissions and unmuted PRS transmissions) in accordance with a muting pattern. During a muted transmission time period or interval, the WTRU may not expect to receive scheduled resources (e.g., PRS symbols) from the network (e.g., from a TRP or gNB) for the reference signal. During an unmuted transmission time period or interval, the WTRU may expect to receive scheduled resources (e.g., PRS symbols) from the network (e.g., a TRP or gNB) for the reference signal. The muted and/or unmuted (e.g., not muted) time period or interval may be indicated by a pattern (e.g., using a bit string or bit map pattern such as "1001"). For example, a pattern (e.g., a bit map pattern) of "1001" may indicate that a first slot and a fourth slot are unmuted slots while a second and a third slots are muted slots. With such a pattern, reference signals (e.g., a sequence of PRS symbols in a slot, which may be defined by a resource element mapping pattern) may be transmitted during the first and fourth slots and not transmitted in the second and third slots. As another example, the WTRU may receive PRS's in accordance with repetitions of a muting pattern such as "10011001." It should be noted that even though the examples given herein associate each bit in the bit map or bit string with a slot, those bits may also represent frames, subframes, symbols, and/or the like.

In examples, a WTRU may be configured with multiple muting patterns and may receive an indication from the network (e.g., a gNB, LMF, etc.) to use a first muting pattern (e.g., muting pattern 1 shown in FIG. 5). The WTRU may switch to a second muting pattern (e.g., muting pattern 3 shown in FIG. 5), for example, in response to determining that the second muting pattern is associated with an earliest subsequent unmuted reference signal (e.g., PRS) transmission. The WTRU may perform the switching, for example, if the WTRU determines that one or more reference signal (e.g., PRS) symbols (e.g., time resources) indicated by the first muting pattern are to be canceled (e.g., due to collision with other transmission/reception symbols or time resources). In examples, the WTRU may determine that one or more PRS time resources (e.g., symbols) indicated by a first muting pattern are to be canceled due to an overlap (e.g., in time) between the PRS time resources and other DL transmission (e.g., PDCCH, PDSCH, etc.) time resources. In examples, the WTRU may determine that one or more PRS time resources indicated by a first muting pattern are to be canceled because the priority level associated with the PRS time resources (e.g., PRS symbols is lower than the priority level of another DL transmission (e.g., a control channel transmission such as a PDCCH transmission that is prioritized over the PRS transmission, as illustrated by FIG. 5). As illustrated in FIG. 5, the WTRU may determine that a PRS is to be transmitted sooner according to a second muting pattern (e.g., muting pattern 3), and may receive the PRS using a time resource indicated by the second muting pattern.

In examples (e.g., after a WTRU switches to a second muting pattern from a first muting pattern and/or receives a PRS indicated by the second muting pattern), a WTRU may be configured to perform at least one of the following: the WTRU may switch back to the first muting pattern to receive reference signals (e.g., PRS's) indicated by the first muting pattern; the WTRU may switch back to a default muting pattern to receive reference signals (e.g., PRS's) indicated by the default muting pattern, for example, if such a default muting pattern is configured by the network (e.g., by an LMF or gNB); the WTRU may prepare to receive reference signals (e.g., PRS's) assuming a muting pattern is not applied to the reference signals.

A WTRU may be configured to switch back to a first muting pattern (e.g., after switching away from the first muting pattern to a second muting pattern) if at least one of the following conditions is satisfied. The WTRU may switch back to the first muting pattern if reference signal resources (e.g., one or more PRS symbols) indicated by the second muting pattern collide with another DL transmission having a higher priority level, and if the first muting pattern provides the earliest reference signal (e.g., PRS) transmission (e.g., after the collision). The WTRU may switch back to the first muting pattern if the default action of the WTRU (e.g., as configured by the network) is to switch back to the first muting pattern after the WTRU receives a PRS symbol associated with the second muting pattern (e.g., after a collision). The WTRU may switch back to the first muting pattern if the WTRU receives an indication from the network (e.g., from a gNB or LMF, and/or via DCI, a MAC-CE, an RRC or LPP message) to switch back to the first muting pattern.

In examples, a WTRU may determine to continue to operate in accordance with a second muting pattern (e.g., after switching to the second muting pattern from a first muting pattern) if at least one of the following conditions is satisfied. The WTRU may determine to keep the second muting pattern if the default action of the WTRU (e.g., as configured by the network) is to keep the second muting pattern and not switch back to the first muting pattern. The WTRU may determine to keep the second muting pattern if reference signal (e.g., PRS) transmissions associated with the first muting pattern would (e.g., periodically) collide with other transmissions (e.g., periodic transmissions on the PDCCH or PDSCH) that have higher priorities than the reference signal transmissions. The WTRU may determine to keep the second muting pattern if the WTRU receives an indication from the network (e.g., from a gNB or LMF, and/or via DCI, a MAC-CE, an RRC or LPP message) to use the second muting pattern.

When referred to herein, a PRS resource may correspond to a collection of time resources such as subframes, symbols, or slots. The term "PRS resource" and "PRS symbol" may be used interchangeably herein.

Rate matching may be applied for PDSCH/PUSCH with or without a zero-powered PRS or SRSp. Puncturing or rate-matching of PDSCH and/or PUSCH may be applied. Puncturing of an RE for PDSCH or PUSCH may be referred to as not sending or not receiving information in the RE in which a PDSCH symbol or a PUSCH symbol is allocated. Rate-matching of an RE for PDSCH or PUSCH may be referred to as not allocating PDSCH or PUSCH resources (e.g., symbols) in the RE.

In some examples, a WTRU may be configured with a set of zero-power (ZP) PRS's or SRSp's. The WTRU may puncture or rate-match around PDSCH/PUSCH REs that may overlap with one or more determined zero-power PRS's or SRSp's. One or more of following may apply. A WTRU may not send any signal on the REs that are configured or indicated as ZP PRS or SRSp resources, for example, if/when the RE is scheduled for a PUSCH transmission. The ZP-PRS or ZP-SRSp resources may overlap with non-zero-power (NZP)-PRS and NZP-SRSp resources, which may be used for positioning related measurements. ZP-PRS or ZP-SRSp resources may be determined, for example, based on an indication of NZP-PRS and/or NZP-SRSp resources. The WTRU may determine ZP-PRS transmissions, which may have the same pattern as indicated NZP-PRS transmissions, for example, if/when the WTRU is indicated to measure the NZP-PRS transmissions. The WTRU may determine ZP-SRSp transmissions, which may have the same pattern as indicated NZP-SRSp transmissions, for example, if/when the WTRU is indicated to send NZP-SRSp's. One or more ZP-PRS and/or ZP-SRSp transmissions may be indicated, for example, in a DCI that schedules PDSCH or PUSCH transmissions.

In some examples, a WTRU may puncture or rate-match around a PDSCH or PUSCH resource, for example, if a scheduled PDSCH RE or a scheduled PUSCH RE collides or overlaps with an RE for a positioning RS. One or more of following may apply. Puncturing of a PDSCH or PUSCH resource (e.g., RE) may be used, for example, if/when positioning RS overheads are less than a threshold (e.g., number of REs in an RB for positioning RS is less than a threshold), and rate-matching of PDSCH or PUSCH RE may be used otherwise (or vice-versa). Puncturing of a PDSCH or PUSCH RE may be used, for example, if/when the positioning RS that overlaps with the RE is a positioning RS targeted for another WTRU, and rate-matching of a PDSCH or PUSCH RE may be used otherwise (or vice-versa). Puncturing of a PDSCH or PUSCH RE may be used, for example, if/when the positioning RS that overlaps with the RE is configured or indicated in DCI, and rate-matching of PDSCH or PUSCH RE may be used otherwise (or vice-versa).

The techniques, methods, and/or procedures described herein may be applicable in multiple (e.g., opposite) communication directions (e.g., an uplink and/or a downlink). For example, puncturing or rate-matching of the PDSCH due to a collision with a downlink reference signal (e.g., a positioning reference signal such as a PRS) may be applicable to or interchangeably used with puncturing or rate-matching of the PUSCH due to a collision with an uplink reference signal (e.g., a positioning reference signal such as a SRSp). For example, the PDSCH may be punctured or rate-matched based on an SRSp, or the PUSCH may be punctured or rate-matched based on a PRS.

Positioning reference signal prioritization (e.g., as described herein) may be applied to power control for uplink and/or downlink transmissions, for example, if/when a WTRU determines that one or more transmissions may overlap in time with the transmission of a positioning reference signal, and if/when the WTRU determines that it is power-limited. The WTRU may receive configuration information from a network (e.g., gNB, LMF, etc.) regarding the priority of a positioning reference signal with respect to a data or control channel signal (e.g., PDCCH, PDSCH, etc.). For example, as described herein, a WTRU may assign (or be configured with) a priority for a positioning reference signal transmission (e.g., an SRSp transmitted to a neighboring cell). If the WTRU determines that the priority associated with the positioning reference signal is low (e.g., the positioning reference signal may, by default, be given a low priority by a legacy system), the WTRU may apply power scaling to the positioning reference signal first (e.g., before other transmissions that may overlap with the positioning reference signal in time). If the WTRU determines that the priority of the positioning reference signal is high, the WTRU may apply power scaling to the other transmissions first (e.g., before the positioning reference signal).

A WTRU may be configured to receive a positioning reference signal such as a PRS outside of a measurement gap (for reference signals). If the positioning reference signal overlaps (e.g., in the time domain) with the transmission of other reference signal(s) and/or channel(s), the WTRU may determine whether to receive the positioning reference signal based on a priority associated with the positioning reference signal and priorities associated with the other transmission(s). For example, the WTRU may determine to receive the other transmission(s) if their priorities are higher than the priority of the positioning reference signal, e.g., by comparing the priorities of the other transmission(s) with the priority of the positioning reference signal. In examples, if a PDSCH transmission and a positioning reference signal are scheduled in overlapping time resources (e.g., symbol(s) or slot(s)) outside of a measurement gap, the WTRU may be configured to receive the PDSCH transmission (e.g., the PDSCH transmission may be deemed to have a higher priority than the positioning reference signal at least outside of a measurement gap).

A WTRU may be configured to receive a positioning reference signal such as a PRS outside of a measurement gap if a validity timer for the measurement gap associated the positioning reference signal expires. A WTRU may be configured to receive a positioning reference signal such as a PRS outside of a measurement gap if the WTRU is not configured with a measurement gap associated with the positioning reference signal. A WTRU may be configured to receive a positioning reference signal such as a PRS outside of a measurement gap for a period of time (e.g., as configured or indicated by a network). This may be the case if the WTRU requests a reconfiguration of measurement gap parameter(s) and is waiting for the network to reconfigure the measurement gap parameter(s). The WTRU may receive an indication from the network about the duration that the WTRU is to wait for the reconfiguration to complete. The WTRU may receive the indication via a DCI, a MAC-CE, an RRC message, etc. In examples, the WTRU may wait for a predefined time period if the WTRU requests the network to provide a reconfiguration.

A WTRU may be configured to receive various types of positioning reference signals (e.g., PRSs) outside of a measurement gap. For example, the WTRU may receive aperiodic PRS's outside of a measurement gap. The aperiodic PRS receptions may be triggered by a DCI. The network may configure transmission of the aperiodic PRS'd to determine measurement(s) for positioning. A measurement gap may not be configured in time for such aperiodic PRS transmissions. If other channel(s) and an aperiodic PRS are scheduled in overlapping time with one or more downlink time resources (e.g., symbols) outside of a measurement gap, a WTRU may determine to receive the aperiodic PRS based on the prioritization techniques described herein. Giving higher priority to aperiodic PRS's may provide the network with flexibility to schedule the aperiodic PRS's and allow for shortened end-to-end latency. If an aperiodic PRS overlaps with other reference signal(s) and/or channel(s) in time, the WTRU may determine to receive the other signal(s) and/or channel(s) (e.g., instead of the PRS's including semi-persistent PRS's) based the contents or types of the other channel(s) or reference signal(s).

A WTRU may be configured to receive a semi-persistent PRS outside of a measurement gap. The semi-persistent PRS may be transmitted from the network at predefined periodicities. The semi-persistent PRS may be transmitted during a duration (e.g., a duration specified or configured by the network). The WTRU may receive an indication (e.g., a MAC-CE) indicating at least one of the following: when the semi-persistent PRS may be transmitted; periodicities of the transmission(s); how long the semi-persistent PRS transmission(s) may last; muting pattern(s) associated with the semi-persistent PRS transmission(s); comb pattern(s) associated with the semi-persistent PRS transmission(s); number of symbol(s) and/or location(s) of the semi-persistent PRS in the frequency domain; frequency hopping pattern(s) associated with the semi-persistent PRS transmission(s); a PRS sequence ID; a PRS resource ID; a PRS resource set ID; and/or the like. The WTRU may determine to receive the semi-persistent PRS according to the priorities of transmissions, e.g., as described herein. Giving higher priority of the semi-persistent PRS may provide the network with flexibility to schedule the semi-persistent PRS and may allow for shortened end-to-end latency. If the semi-persistent PRS overlaps with other reference signal(s) or channel(s) in time, the WTRU may determine to receive the other reference signal(s) or channel(s) (e.g., instead of the semi-persistent PRS) based on the content(s) or type(s) of the other channel(s) or reference signal(s).

A WTRU may be configured to receive periodic PRS's outside of a measurement gap. The WTRU may receive a RRC transmission indicating parameter(s) for the periodic PRS transmission(s). The WTRU may determine to receive the periodic PRS's according to the priorities of transmissions, e.g., as described herein. If the periodic PRS's overlap with other reference signal(s) or channel(s) in time, the WTRU may determine to receive the other reference signal(s) or channel(s) (e.g., instead of the periodic PRS's) based on the content(s) or type(s) of the other channel(s) or reference signal(s).

A WTRU may be configured to skip a measurement configuration procedure and transition (e.g., directly transition) to receiving a PRS, for example, in response to receiving a PRS configuration and/or location request message from the network. The WTRU may determine whether to skip the measurement gap procedure or to send a RRC request for a measurement gap configuration based on a priority indication provided in PRS configuration information and/or a location request. If the WTRU determines to skip the measurement gap procedure, the WTRU may use a default measurement gap configuration, e.g., possibly associated with a PRS configuration, for determining the timing for when to transition to receiving/measuring a PRS and when to leave the default measurement gap for normal reception of data and other RS(s).

A WTRU may be configured (e.g., by a RAN) with one or more measurement gap configurations associated with positioning reference signals (e.g., PRS's) and the WTRU may select a measurement gap configuration based on the priorities associated with the positioning reference signals. In examples, the different measurement gap configurations may be associated with respective identifiers and a mapping may be provided between the priorities of PRS's and the priorities of the measurement gap configurations. For example, a PRS configuration with a high priority may be mapped to a measurement gap with a short start duration (e.g., a number of time slots after which the WTRU may transition to measuring the PRS), a long measurement duration (e.g., a number of time slots during which the WTRU may perform PRS measurements), and/or a high periodicity of the measurement gap, e.g., such that the measurement of the PRS may be performed with a higher priority than the reception of other RS(s) or data. A PRS configuration with a low priority may be mapped to a measurement gap with a long start duration, a short measurement duration, and/or a low periodicity. In examples, in response to receiving a PRS configuration and/or a location request from the network, the WTRU may determine and/or select a measurement gap configuration. The WTRU may send an indication to the network (e.g., a RAN) indicating the identifier of the selected measurement gap configuration (e.g., in a UL MAC CE or UCI (PUCCH)). In examples, the WTRU may send a request (e.g., to the RAN) for a measurement gap configuration (e.g., in a UL MAC CE or UCI) for certain PRS configuration(s) with a priority above a certain threshold. The WTRU may receive from the RAN, (e.g., in a DL MAC CE or DCI (PDCCH)), an indication to activate a measurement gap configuration. The activation message received by the WTRU may include the identifier of a measurement gap configuration and/or parameter(s) associated with a measurement gap, which the WTRU may apply during PRS reception and measurement.

A WTRU may be configured to transmit or receive a positioning reference signal such as a PRS and/or a SRSp simultaneously with other DL/UL signals. These overlapping DL/UL transmissions may be configured (including dynamically configured) DL/UL transmissions such as those performed using a configured UL grant, a configured PUCCH transmissions, or a DL SPS, etc. For example, the WTRU may be configured to simultaneously (e.g., in the same slot or symbol) receive a DL PRS and one or more other DL transmissions (e.g., a PDSCH transmission) instead of dropping the DL PRS or the DL transmissions. The DL PRS transmission and the other DL transmission(s) may overlap partially or completely in the time domain and/or the frequency domain. The WTRU may be configured to simultaneously (e.g., in the same slot or symbol) transmit an SRSp and one or more other UL transmissions (e.g., a PUSCH transmission) instead of dropping the SRSp or the other UL transmission(s). The WTRU may determine whether to simultaneously receive a DL PRS and another DL signal, or to simultaneously transmit an SRSp and another UL signal, based on one or a combination of the following: a priority associated with the DL PRS/SRSp and a priority associated with the DL/UL signal; a latency requirement associated with the DL PRS/SRSp and a latency requirement associated with the DL/UL signal; WTRU capabilities; a bandwidth part (BWP) on which the DL PRS/SRSp and the DL/UL transmission is configured; a measurement gap configuration of the DL PRS, etc.

In examples, a WTRU may simultaneously receive or transmit a positioning reference signal with another DL/UL signal if the priority associated with the positioning reference signal (e.g., DL PRS or SRSp) is equal to the priority associated with the DL/UL signal. In examples, if a DL PRS overlaps with a PDSCH transmission and both DL transmissions have the same priority, the WTRU may be configured to receive both DL transmissions (e.g., without dropping either signal). In examples, the WTRU may be configured to receive both a DL PRS transmission and a PDSCH transmission if the priority of the DL PRS is above a first threshold and the priority of the PDSCH transmission is above a second threshold. Such thresholds may be pre-configured or fixed. In examples, if a DL PRS is associated with a positioning service that includes short latency and another DL transmission is associated with a URLLC type of services, the WTRU may simultaneously receive both transmission (e.g., without dropping either signal). The WTRU may be configured to determine the latency associated with a DL PRS based on a configured periodicity of the DL PRS. In examples, the WTRU may report to the network the WTRU's capability for simultaneously receiving a DL PRS and another DL signal. The network (e.g., a gNB) may then (e.g., semi-statically) enable the WTRU to simultaneously receive the DL signal and the DL PRS. In examples, the network (e.g., a gNB) may enable simultaneous transmission of a DL PRS and another DL signal on a BWP basis (e.g., per BWP).

A measurement gap (MG) configuration may include a priority configured for a MG of a DL PRS and/or an indication of whether a MG is configured for a DL PRS. If an overlap or collision occurs between a DL PRS and another DL transmission, a WTRU may use the priority associated with the MG of the DL PRS and the priority associated with other DL transmission to determine if simultaneous reception of the DL PRS and the other DL transmission is to be performed. In examples, if the priority associated with the MG is equal to (e.g., substantially similar to) the priority associated with the overlapping DL transmission, the WTRU may simultaneously receive both transmissions. In examples, if the priority of the MG is above a first configured threshold and the priority of the DL transmission is above a second configured threshold, the WTRU may simultaneously receive both transmissions. In examples, if the MG configuration indicates that the WTRU is not configured with a MG for a DL PRS, the WTRU may assume that it may simultaneously receive a DL PRS transmission and another DL transmission if those transmission overlap with each other.

A WTRU may report to a network (e.g., a gNB) that the WTRU is capable of receiving a DL PRS and another overlapping DL transmission. The network may (e.g., in response) enable and/or instruct (e.g., via RRC signaling) the WTRU to simultaneously receive a DL PRS and another DL transmission. If an overlap occurs between a DL PRS and another DL transmission, the WTRU may determine the priority of the DL PRS and/or the priority of a MG for the DL PRS, and compare the priority (or priorities) to the priority of the overlapping DL transmission. The WTRU may determine whether to drop the DL PRS or the overlapping DL transmission based on the determination and/or comparison.

A WTRU may be configured to assume that a DL PRS transmission is rate matched or punctured around one or more resources that are also used to transmit another DL transmission (e.g., an overlapping DL transmission). A WTRU may be configured to assume that a DL transmission (e.g., data or control transmission) is rate matched or punctured around one or more resources that are also used to transmit a DL PRS. The WTRU may be informed by a network (e.g., dynamically via DCI) about which one or more of the overlapping transmissions are rate matched or punctured, or the WTRU may autonomously determine which one or more of the overlapping transmissions are rate matched or punctured. In examples, the WTRU may be configured to determine whether an overlapping DL transmission is rate matched if the number of overlapped symbols is below a configured threshold. In examples, if a PDSCH transmission is overlapping with a DL PRS and the number of overlapping symbols is below a configured threshold, the WTRU may assume that the PDSCH is rate matched around the DL PRS. In examples, the WTRU may be configured to determine which one or more transmissions are rate matched based on the number of overlapped resource elements (REs) over a total allocation of REs. In examples, the WTRU may assume that a PDSCH is rate matched if (Number of overlapped REs)/(Total number of allocated REs) is above a configured threshold, where the "Total number of allocated REs" may represent the total number of REs configured for a PDSCH and the "Number of overlapped REs" may represent the number of REs in which the PDSCH overlaps with a DL PRS. In examples, the WTRU may assume that a DL PRS may be rate matched or punctured if (e.g., only if) the DL PRS is associated with a cell serving the WTRU.

A WTRU may be configured to receive an indication of puncturing and/or interruption for a DL PRS transmission via a group common DCI. For example, a WTRU that is not receiving an overlapping DL transmission may not be aware of whether a DL PRS transmission is punctured or not. Such a WTRU may be configured with a common search space to monitor for a specific DCI format that may indicate whether a DL PRS resource will be punctured or was punctured. The WTRU may receive (e.g., via the DCI format) such a puncturing or interruption indication prior to receiving a DL PRS. In examples, the WTRU may receive the puncturing/interruption indication after processing a DL PRS (e.g., in a buffer) and the WTRU may process the buffered DL PRS reception again based on the puncturing/interruption indication.

A WTRU may be re-configured with a different positioning RS resource, for example, such that the WTRU may be able to receive or transmit a positioning RS simultaneously with another DL/UL signal. In examples, the WTRU may be re-configured using dynamic signaling, such as via DCI or a MAC CE. In examples, the DCI that schedules an overlapping DL/UL transmission may be used to reconfigure a DL PRS and/or an SRSp transmission (e.g., using a bitfield in the DCI). In examples, the WTRU may receive a separate DCI that reconfigures a DL PRS and/or an SRSp. In examples, RS signals such as a DL PRS or an SRSp may be shifted in the time and/or the frequency domain. In examples, the WTRU may be pre-configured with shifting parameters such as an RB offset and/or a time offset that may be applies if simultaneous transmission or reception of a positioning reference signal and another DL/UL signal is enabled. For instance, the WTRU may be configured with an RB offset associated with an SRSp resource that starts at RB x. If no UL transmission overlaps with the SRSp, the WTRU may transmit the SRSp using RB x. If the SRSp overlaps with an UL transmission and the WTRU determines that simultaneous transmission is enabled, the WTRU may transmit the SRSp using (RB x+RB offset).

A WTRU may be configured (e.g., semi-statically) with a second SRSp resource that may be used if a first SRSp resource is dropped due to an overlap or conflict with another UL transmission resource. The first SRSp resource in this scenario may be referred to as the active SRSp resource or the SRSp resource configured for positioning. The second SRSp resource may be referred to as the alternative SRSp resource (e.g., a resource that is used if (e.g., only if) an overlap occurs between the active SRSp resource and another UL transmission resource). In examples, the second SRSp resource (e.g., the alternative SRSp resource) may be offset by a value in time and/or frequency domains from the first SRSp resource (e.g., the active SRSp resource). In examples, the second SRSp resource (e.g., the alternative SRSp resource) may be associated with a different start position, a different number of symbols, a different frequency domain position, a different frequency hopping pattern, and/or a different power control configuration compared to the first SRSp resource (e.g., the active SRSp resource).

A WTRU may be configured to exclude certain DL PRS configurations from the WTRU's positioning estimation or the WTRU's measurement reporting to a network. For example, the WTRU may exclude a DL PRS configuration from measurement reporting and/or position estimation if the number of DL PRS transmissions that was punctured or interrupted is above a configured threshold (e.g., configured by an LMF). The WTRU may be configured to track the number of punctured or interrupted DL PRS resources (e.g., using a counter), and report to a network (e.g., an LMF) the set of DL PRS resources (e.g., resource configurations) that are excluded due to the puncturing or interruption. In examples, the WTRU may report to the LMF the set of DL PRS resources that is punctured or interrupted along with measurement results of the punctured or interrupted DL PRS.

Figure 6:
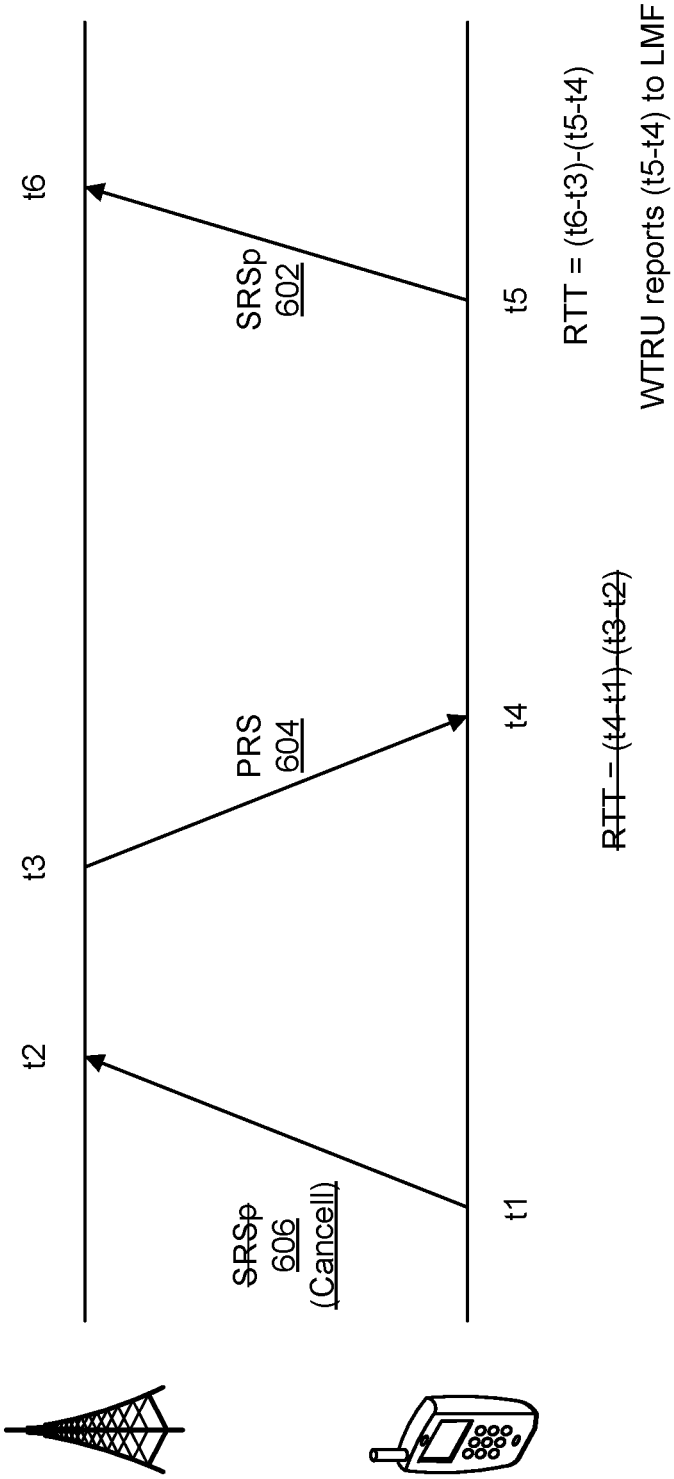
FIG. 6 illustrates a first example of determining and reporting a transmission time difference between a sounding reference signal for positioning (SRSp) transmission and a positioning reference signal (PRS) transmission.

FIG. 6 illustrates an example use of a transmission time difference between a second SRSp transmission 602 (e.g., an alternative SRSp transmission) and a first PRS transmission 604 (e.g., a previous PRS transmission). If a WTRU is configured to use a multi-RTT positioning method, the WTRU may not report the time difference between a first SRSp 606 (e.g., a cancelled SRSp) and the first PRS 604 and may instead report the timing difference between the second SRSp transmission 602 and the first PRS 604. As shown in the figure, the WTRU may be configured to transmit the second SRSp 602 at time t5 due to the first SRSp being cancelled at t1. As such, the WTRU may report (t5−t4) to an LMF.

Figure 7:
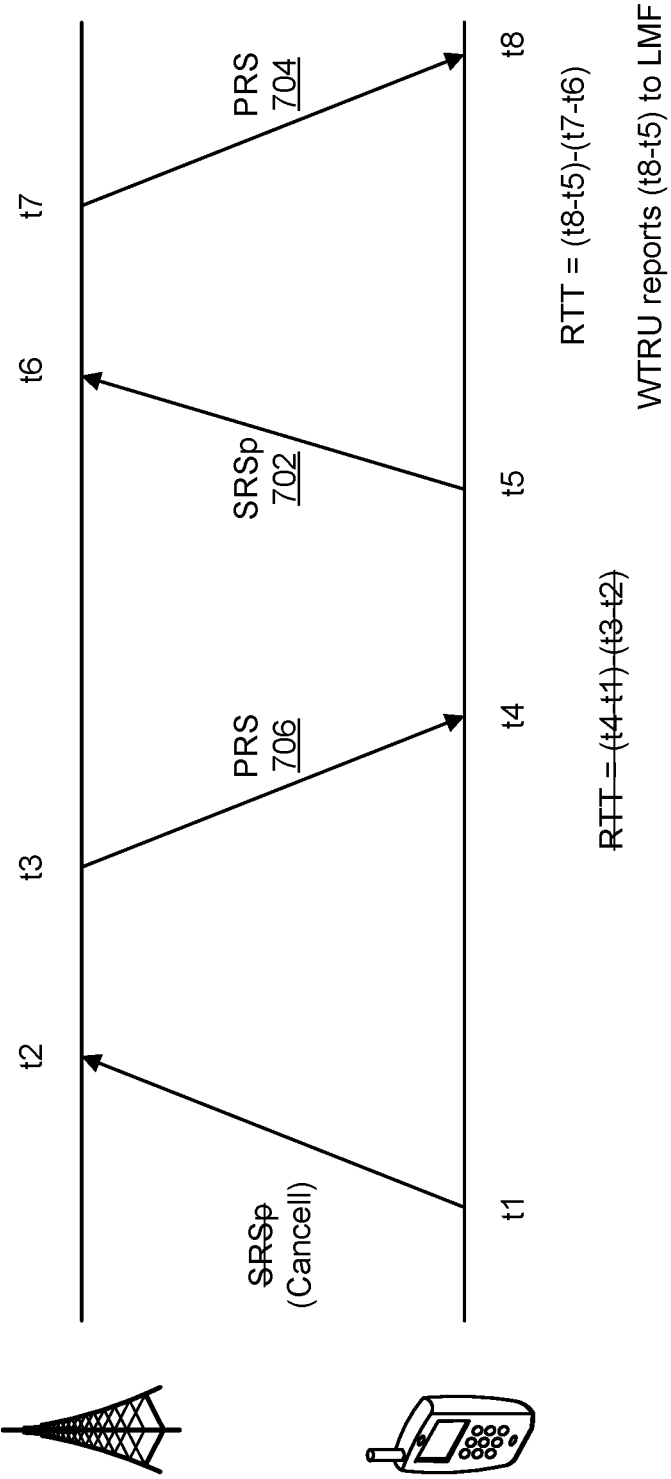
FIG. 7 illustrates a second example of determining and reporting a transmission time difference between an SRSp transmission and a PRS transmission.

FIG. 7 illustrates an example use of a transmission time difference between a second SRSp transmission 702 (e.g., an alternative SRSp transmission) and a second PRS transmission 704 (e.g., a next PRS transmission). The WTRU may be configured to report the time difference between the second SRSp 702 and the second PRS 704 instead of a first PRS 706 (e.g., a previously received PRS). As shown in the figure, the WTRU may be configured to report the time difference (t8−t5) to an LMF. In examples, the WTRU may be configured to select between reporting the time difference between the second SRSp 702 and the first PRS 706 or reporting the time difference between the second SRSp 702 and the second PRS 704 based on the latency requirement of the positioning service. The WTRU may report the time difference between the second SRSp 702 and the first PRS 706 for a low latency type of service.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed:

1. A wireless transmit/receive unit (WTRU) comprising:
a processor configured to:
   receive radio resource control (RRC) configuration information from a network device, wherein the RRC configuration information indicates a time period for measuring a positioning reference signal (PRS) transmission and a priority of the PRS transmission compared to one or more other downlink transmissions;
   determine, based on an indication from the network device, that the time period is available for measuring the PRS transmission;
   responsive to determining that the time period is available for measuring the PRS transmission and based on a further determination to measure the PRS transmission outside a measurement gap configured for the WTRU, determine, based on the priority of the PRS transmission indicated by the RRC configuration information, whether the PRS transmission has a higher priority than the one or more other downlink transmissions; and
   based on a determination that the PRS transmission has the higher priority than the one or more other downlink transmissions, receive the PRS transmission.

2. The WTRU of claim 1, wherein the processor being configured to receive the PRS transmission comprises the processor being configured to measure the PRS transmission during the time period.

3. The WTRU of claim 2, wherein the processor is further configured to determine a position of the WTRU based on the measurement of the PRS transmission.

4. The WTRU of claim 1, wherein, based on the determination that the PRS transmission has the higher priority than the one or more other downlink transmissions, the processor is further configured to not receive the one or more other downlink transmissions during the time period indicated by the RRC configuration information.

5. The WTRU of claim 1, wherein the one or more other downlink transmissions include a downlink shared channel transmission.

6. The WTRU of claim 1, wherein, based on a determination that the PRS transmission does not have the higher priority than the one or more other downlink transmissions, the processor is further configured to receive the one or more other downlink transmissions instead of the PRS transmission during the time period.

7. The WTRU of claim 1, wherein the time period indicated by the RRC configuration information is outside a measurement gap.

8. The WTRU of claim 1, wherein the indication from the network device indicates that the WTRU is to receive the PRS transmission or the one or more other downlink transmissions during the time period indicated by the RRC configuration information.

9. The WTRU of claim 1, wherein the PRS transmission and the one or more other downlink transmissions overlap in at least one symbol.

10. The WTRU of claim 1, wherein the indication is received from the network device via a medium access control (MAC) control element (CE).

11. The WTRU of claim 1, wherein a length of the time period is indicated by the RRC configuration information in terms of one or more slots.

12. A method implemented by a wireless transmit/receive unit (WTRU), the method comprising:
   receiving radio resource control (RRC) configuration information from a network device, wherein the RRC configuration information indicates a time period for measuring a positioning reference signal (PRS) transmission and a priority of the PRS transmission compared to one or more other downlink transmissions;
   determining, based on an indication from the network device that the time period is available for measuring the PRS transmission;
   responsive to determining that the time period is available for measuring the PRS transmission and based on a further determination to measure the PRS transmission outside a measurement gap configured for the WTRU, determine, based on the priority of the PRS transmission indicated by the RRC configuration information, whether the PRS transmission has a higher priority than the one or more other downlink transmissions; and
   based on a determination to receive the PRS transmission has the higher priority than the one or more other transmissions, receiving the PRS transmission during the time period.

13. The method of claim 12, wherein receiving the PRS transmission comprises measuring the PRS transmission during the time period.

14. The method of claim 13, further comprising determining a position of the WTRU based on the measurement of the PRS transmission.

15. The method of claim 12, wherein the one or more other downlink transmissions include a downlink shared channel transmission.

16. The method of claim 12, further comprising, based on a determination that the PRS transmission does not have the higher priority than the one or more other downlink transmissions, receiving the one or more other downlink transmissions instead of the PRS transmission during the time period.

17. The method of claim 12, wherein the time period indicated by the RRC configuration information is outside a measurement gap.

18. The method of claim 12, wherein the indication from the network device indicates that the WTRU is to receive the PRS transmission or the one or more other downlink transmissions during the time period indicated by the RRC configuration information.

19. The method of claim 12, wherein the indication from the network device is received via a medium access control (MAC) control element (CE).

20. The method of claim 12, wherein a length of the time period is indicated by the RRC configuration information in terms of one or more slots.

21. A wireless transmit/receive unit (WTRU) comprising:
a processor configured to:
- receive an indication of a positioning reference signal (PRS) resource set;
- determine a positioning method for determining a position of the WTRU;
- determine that one or more PRS resources of the PRS resource set are prioritized for the positioning method;
- perform a measurement associated with the positioning method using the one or more PRS resources; and
- send a report that indicates the measurement associated with the positioning method.

22. The WTRU of claim 21, wherein the positioning method comprises downlink angle of departure (DL-AoD), and wherein the measurement associated with the positioning method comprises a reference signal received power (RSRP) measurement of the subset of the PRS resource set.

\* \* \* \* \*